United States Patent
Kuge et al.

(10) Patent No.: US 12,345,311 B2
(45) Date of Patent: Jul. 1, 2025

(54) TORQUE GENERATION DEVICE

(71) Applicant: Alps Alpine Co., Ltd., Tokyo (JP)

(72) Inventors: Yoshihiro Kuge, Miyagi-ken (JP); Kazunari Takahashi, Miyagi-ken (JP); Misuzu Takahashi, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 972 days.

(21) Appl. No.: 17/466,197

(22) Filed: Sep. 3, 2021

(65) Prior Publication Data
US 2021/0396280 A1 Dec. 23, 2021

Related U.S. Application Data

(63) Continuation of application No. PCT/JP2020/009625, filed on Mar. 6, 2020.

(30) Foreign Application Priority Data

Mar. 15, 2019 (JP) .................................. 2019-048873
Jun. 10, 2019 (JP) .................................. 2019-108211

(51) Int. Cl.
*F16F 9/53* (2006.01)
*F16D 37/02* (2006.01)
(Continued)

(52) U.S. Cl.
CPC .............. *F16F 9/535* (2013.01); *F16F 9/125* (2013.01); *F16F 2222/06* (2013.01);
(Continued)

(58) Field of Classification Search
CPC ........ F16F 9/535; F16F 9/125; F16F 2222/06; F16F 2224/045; F16F 2232/02;
(Continued)

(56) References Cited

U.S. PATENT DOCUMENTS

| 4,335,928 A | 6/1982 | Barrett et al. | |
|---|---|---|---|
| 4,896,754 A | * 1/1990 | Carlson ................ | H02K 49/104 464/29 |

(Continued)

FOREIGN PATENT DOCUMENTS

| JP | 2017-044215 A | 3/2017 |
|---|---|---|
| JP | 2017-182147 A | 10/2017 |

*Primary Examiner* — Bradley T King
*Assistant Examiner* — James K Hsiao
(74) *Attorney, Agent, or Firm* — Harness, Dickey & Pierce, P.L.C.

(57) ABSTRACT

A torque generation device includes a rotor connected to a shaft and rotatable about a rotary axis of the shaft; an external member disposed outside the rotor and rotatable about the rotary axis relative to the rotor; a magnetically responsive material in a gap between the rotor and external member; a magnetic field generating unit generating a magnetic field passing the magnetically responsive material; and an adjusting unit between the shaft and external member along an outer circumference of the shaft, wherein the adjusting unit has a containing space where an adjusting sealing member is provided, the magnetically responsive material is sealed in the gap, containing space, and path connecting these and in an adjustment space from a position where the adjusting sealing member is provided to the path, and a capacity of the adjustment space is changeable according to a change in volume of the magnetically responsive material.

16 Claims, 16 Drawing Sheets

(51) Int. Cl.
  *F16D 57/00* (2006.01)
  *F16F 9/12* (2006.01)
(52) U.S. Cl.
  CPC ..... *F16F 2224/045* (2013.01); *F16F 2232/02* (2013.01); *F16F 2236/106* (2013.01)
(58) Field of Classification Search
  CPC .. F16F 2236/106; F16F 2037/002; F16F 9/52; F16F 9/12; F16D 37/02; F16D 57/002
  See application file for complete search history.

(56) References Cited

U.S. PATENT DOCUMENTS

| | | | | |
|---|---|---|---|---|
| 5,816,372 | A * | 10/1998 | Carlson | A63B 21/00845 |
| | | | | 188/290 |
| 5,988,336 | A * | 11/1999 | Wendt | F16D 37/02 |
| | | | | 192/58.4 |
| 5,992,582 | A * | 11/1999 | Lou | F16F 9/12 |
| | | | | 188/269 |
| 6,208,743 | B1 * | 3/2001 | Marten | H04R 9/027 |
| | | | | 381/430 |
| 6,380,733 | B1 * | 4/2002 | Apel | G05G 9/047 |
| | | | | 74/10.41 |
| 6,679,508 | B2 * | 1/2004 | Smith, Jr. | B62D 7/22 |
| | | | | 188/267.2 |
| 8,245,679 | B2 * | 8/2012 | Morishima | F01L 1/352 |
| | | | | 123/90.15 |
| 8,627,794 | B2 * | 1/2014 | Oe | B60T 10/00 |
| | | | | 123/90.15 |
| 8,960,397 | B2 * | 2/2015 | Maas | F16D 37/02 |
| | | | | 192/58.41 |
| 9,312,090 | B2 * | 4/2016 | Kaufmann | H01J 35/16 |
| 2003/0079948 | A1 * | 5/2003 | Jolly | F16D 57/002 |
| | | | | 188/267 |
| 2006/0272915 | A1 * | 12/2006 | Gassmann | F16D 37/02 |
| | | | | 192/21.5 |
| 2006/0280575 | A1 * | 12/2006 | Ruettiger | B60K 35/10 |
| | | | | 411/15 |
| 2010/0095920 | A1 * | 4/2010 | Morishima | F01L 1/344 |
| | | | | 123/90.17 |
| 2010/0186400 | A1 * | 7/2010 | Preston | F03G 7/10 |
| | | | | 60/325 |
| 2011/0128135 | A1 * | 6/2011 | Periquet | F16F 9/535 |
| | | | | 340/407.2 |
| 2012/0291732 | A1 * | 11/2012 | Oe | B60T 10/00 |
| | | | | 188/267.2 |
| 2016/0378131 | A1 * | 12/2016 | Battlogg | F16H 59/0217 |
| | | | | 74/553 |
| 2017/0227980 | A1 * | 8/2017 | Hafez | F16F 9/535 |
| 2018/0156285 | A1 * | 6/2018 | Plante | F16D 37/02 |
| 2018/0298959 | A1 * | 10/2018 | Battlogg | F16D 57/002 |
| 2019/0286184 | A1 * | 9/2019 | Takahashi | G05G 1/08 |

* cited by examiner

TORQUE GENERATION DEVICE

CLAIM OF PRIORITY

This application is a Continuation of International Application No. PCT/JP2020/009625 filed on Mar. 6, 2020, which claims benefit of Japanese Patent Application No. 2019-048873 filed on Mar. 15, 2019 and No. 2019-108211 filed on Jun. 10, 2019. The entire contents of each application noted above are hereby incorporated by reference.

BACKGROUND OF THE INVENTION

1. Field of the Invention

The present invention relates to a torque generation device that can change rotational resistance by using a magnetically responsive material.

2. Description of the Related Art

In a magnetorheological fluid device described in Japanese Unexamined Patent Application Publication No. 2017-044215, a magnetorheological fluid is present between two members that are provided so as to be rotatable relative to each other, a magnetic field generating unit for applying a magnetic field to the magnetorheological fluid is provided, and a sealing material that seals a gap between a shaft and a casing member so that the magnetorheological fluid does not leak out from a device body is provided. A flexible member that operates to enlarge and reduce a capacity of a space in which the magnetorheological fluid is sealed so as to follow expansion and contraction of a volume of the magnetorheological fluid is provided.

SUMMARY OF THE INVENTION

However, the magnetorheological fluid device described in Japanese Unexamined Patent Application Publication No. 2017-044215 additionally needs the flexible member for enlarging and reducing the capacity of the space in which the magnetorheological fluid is sealed. This invites an increase in the number of components and a change of a manufacturing process.

The present invention provides a torque generation device that can enlarge and reduce a capacity of a space in which a magnetorheological fluid is sealed so as to follow expansion and contraction of a volume of the magnetorheological fluid without increasing the number of components and without markedly changing a manufacturing process.

In order to solve the above problem, a torque generation device according to the present invention includes a rotor that is connected to a shaft and is rotatable about a rotary axis of the shaft; an external member that is disposed outside the rotor and is rotatable about the rotary axis relative to the rotor; a magnetically responsive material disposed in a gap between the rotor and the external member; a magnetic field generating unit that generates a magnetic field passing the magnetically responsive material; and an adjusting unit provided between the shaft and the external member along an outer circumference of the shaft, wherein the adjusting unit has a containing space in which an adjusting sealing member is provided, the magnetically responsive material is sealed in the gap, the containing space, and a path connecting the gap and the containing space and is sealed in an adjustment space provided from a position where the adjusting sealing member is provided to the path in the containing space, and the adjusting unit is configured such that a capacity of the adjustment space is changeable in accordance with a change in volume of the magnetically responsive material.

This can provide a torque generation device that can enlarge and reduce a capacity of a space in which a magnetorheological fluid is sealed so as to follow expansion and contraction of a volume of the magnetorheological fluid without adding a new member such as a flexible member and without markedly changing a manufacturing process. Therefore, even in a case where a change occurs in volume of the magnetically responsive material due to a change in temperature, a change over time, or the like, stable desired resistance (torque) can be given to a rotor.

The torque generation device according to the present invention is preferably arranged such that the adjusting unit is configured such that the adjusting sealing member is movable along an axial direction of the rotary axis in the containing space.

Since the adjusting sealing member moves in the containing space, the capacity of the adjustment space is changeable, and it is therefore possible to enlarge and reduce a capacity of a space in which a magnetorheological fluid is sealed so as to follow expansion and contraction of a volume of the magnetorheological fluid. Furthermore, since the containing space is provided along the axial direction of the rotary axis, the containing space can be made wide without markedly changing a configuration of the torque generation device.

The torque generation device according to the present invention is preferably arranged such that the adjustment space is provided between a recessed part of the external member and an outer circumferential surface of the shaft.

Furthermore, the torque generation device according to the present invention is preferably arranged such that the adjustment space is provided between a small-diameter part of the shaft and the external member.

This makes it possible to change an adjustment space in accordance with a change in volume of the magnetically responsive material without adding a new member and without markedly changing a manufacturing process.

The torque generation device according to the present invention is preferable arranged such that the adjusting sealing member is a ring member having elasticity.

This allows the adjusting sealing member to move in the adjustment space while assuring liquid-tightness of the adjustment space. Since the magnetically responsive material is thus prevented from flowing out from the adjustment space, the adjustment space can be precisely changed in accordance with a change in volume of the magnetically responsive material.

The torque generation device according to the present invention is preferably arranged such that the rotor is a rotating plate having a surface perpendicular to the rotary axis; the external member has a first shaft bearing part that supports the shaft in a relatively rotatable manner and a first opposed part that faces one surface of the rotating plate; and the adjustment space is provided between the first shaft bearing part and the first opposed part in an axial direction of the rotary axis.

This allows the magnetically responsive material to make contact with the rotor in a wide area, thereby making a control width of resistance (torque) to be given to the shaft wide.

The torque generation device according to the present invention is preferably arranged such that the magnetic field generating unit includes a coil through which a current is passed to generate a magnetic field; and the external member includes a first yoke and a second yoke that guide the magnetic field generated by the coil.

With the configuration, a magnetic circuit through which lines of magnetic force of a magnetic field generated by the magnetic field generating unit flow can be configured, and desired resistance can be generated by effectively giving the lines of magnetic force to the magnetically responsive material.

The torque generation device according to the present invention is preferably arranged such that the adjustment space is provided between the shaft and the first yoke; the first yoke includes the first shaft bearing part and the first opposed part; and the second yoke has a second opposed part that faces the other surface of the rotating plate.

This allows a yoke that guides a magnetic field generated by the magnetic field generating unit to be disposed close to the rotor, thereby allowing lines of magnetic force to efficiently pass the rotor.

The torque generation device according to the present invention is preferably arranged such that the second yoke includes a second shaft bearing part that supports the shaft in a relatively rotatable manner; and the shaft is supported by the first shaft bearing part from an outer side in the radial direction and is supported by the second shaft bearing part from the axial direction of the rotary axis.

This can realize a configuration in which the rotary axis is stably rotated without adding a new member.

The torque generation device according to the present invention is preferably arranged such that the first opposed part has a thin plate shape.

This can keep a height of the whole device low.

The torque generation device according to the present invention is preferably arranged such that the external member includes a first sealing member including the first shaft bearing part and the first opposed part and a second sealing member connected to the first sealing member on an outer circumferential side of the rotating plate so that the rotating plate and the gap are sandwiched between the first sealing member and the second sealing member.

With the configuration, the first sealing member and the second sealing member can be joined to each other so that the magnetically responsive material is sealed in a gap between the rotating plate and the first sealing member and the second sealing member. It is therefore possible to break down the device while holding the magnetically responsive material with certainty and to reuse the magnetically responsive material according to specifications of the device.

The torque generation device according to the present invention is preferably arranged such that the second sealing member includes a second shaft bearing part that supports the shaft in a relatively rotatable manner; and the shaft is supported by the first shaft bearing part from an outer side in the radial direction and is supported by the second shaft bearing part from the axial direction of the rotary axis.

This can realize a configuration in which the rotary axis is stably rotated without adding a new member.

The torque generation device according to the present invention is preferably arranged such that the magnetic field generating unit includes a coil through which a current is passed to generate a magnetic field; the external member further includes a first yoke that guides the magnetic field generated by the coil; and the rotating plate and the second sealing member are made of a magnetic body.

With the configuration, a magnetic circuit through which lines of magnetic force of a magnetic field generated by the magnetic field generating unit flow can be configured, and desired resistance can be generated by effectively giving the lines of magnetic force to the magnetically responsive material.

The torque generation device according to the present invention is preferably arranged such that the first sealing member is made of a non-magnetic body.

This can keep influence on the magnetic circuit small, thereby efficiently generating resistance.

The torque generation device according to the present invention is preferably arranged such that the shaft is made of a non-magnetic body.

This allows lines of magnetic force to efficiently enter a more outer side of the rotor without passing the shaft, thereby widening a control width of resistance.

The torque generation device according to the present invention is preferably arranged such that the containing space is formed so that an area thereof in plan view increases toward the rotor.

With the configuration, the adjusting sealing member is easier to move toward the rotor when a pressure of the magnetically responsive material decreases, and therefore a position of the adjusting sealing member can be smoothly and speedily changed in response to a change in volume of the magnetically responsive material.

The torque generation device according to the present invention is preferably arranged such that the adjusting sealing member is a ring member having a shape elastically deformable at least along an axial direction of the rotary axis.

With the configuration, a change in capacity of the adjustment space can be made large by elastic deformation of the adjusting sealing member in the containing space, and thereby expansion and contraction of the volume of the magnetically responsive material can be compensated for.

The torque generation device according to the present invention is preferably arranged such that the ring member is constituted by two V-rings whose cross sections orthogonal to a circumferential direction about the rotary axis each have a V-shape, and each of the two V-rings has, as the V-shape, two arm parts extending from a base end position to a terminal end position in a direction along the rotary axis, and the two arm parts are configured such that start ends thereof are joined to each other at the base end position and a distance therebetween increases in a radial direction toward the terminal end position, and the start ends of the two V-rings are in contact with or in proximity with each other in a direction along the rotary axis.

With the configuration, the adjusting sealing member is easy to move in the axial direction when the volume of the magnetically responsive material increases or decreases.

The torque generation device according to the present invention is preferably arranged such that the adjusting unit includes a ventilation part that allows outside air to flow out of the containing space and into the containing space.

This allows air in the adjustment space to escape to an outside only in a case where a pressure in the adjustment space becomes higher than a predetermined value, thereby keeping the pressure equal or less than a certain value.

BRIEF DESCRIPTION OF THE DRAWINGS

FIG. 14A is a plan view, and FIG. 14B is a cross-sectional view taken along line XIVB-XIVB in FIG. 14A;

DESCRIPTION OF THE PREFERRED EMBODIMENTS

Torque generation devices according to embodiments of the present invention are described in detail below with reference to the drawings.

First Embodiment

Figure 1A:
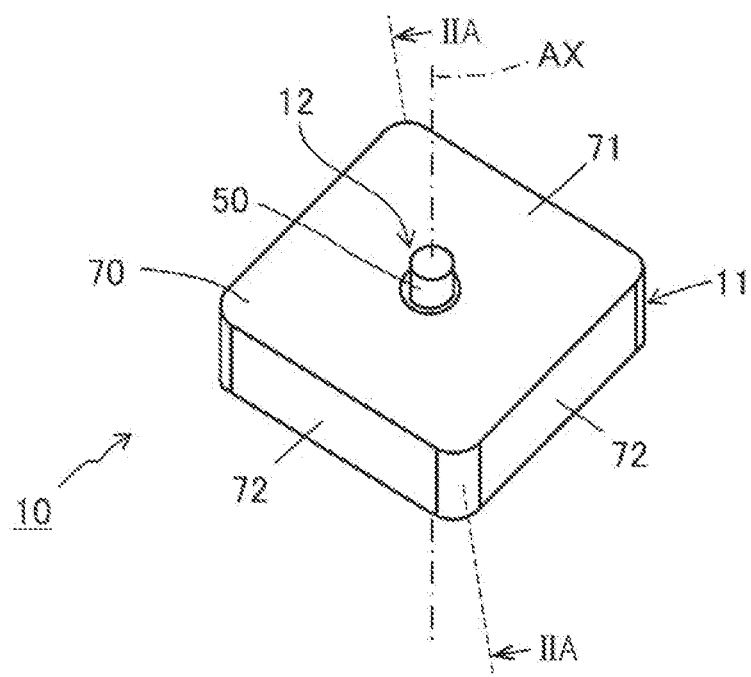
FIG. 1A is a perspective view of a torque generation device according to a first embodiment of the present invention viewed from an upper side.
Figure 1B:
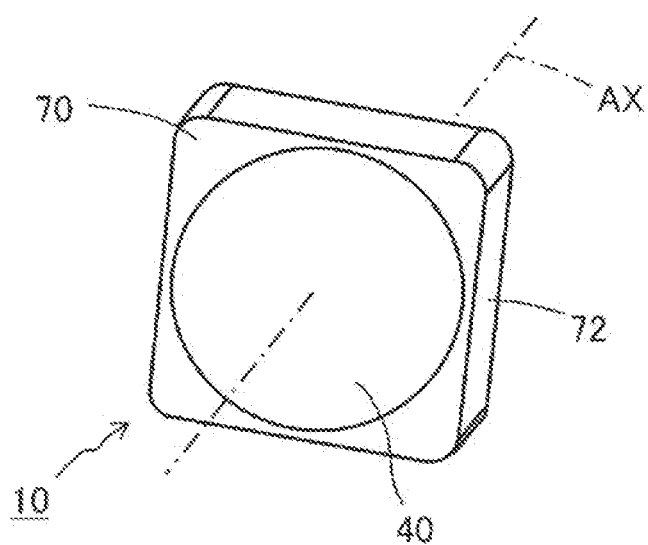
FIG. 1B is a perspective view of the torque generation device of FIG. 1A viewed from a lower side.
Figure 2A:
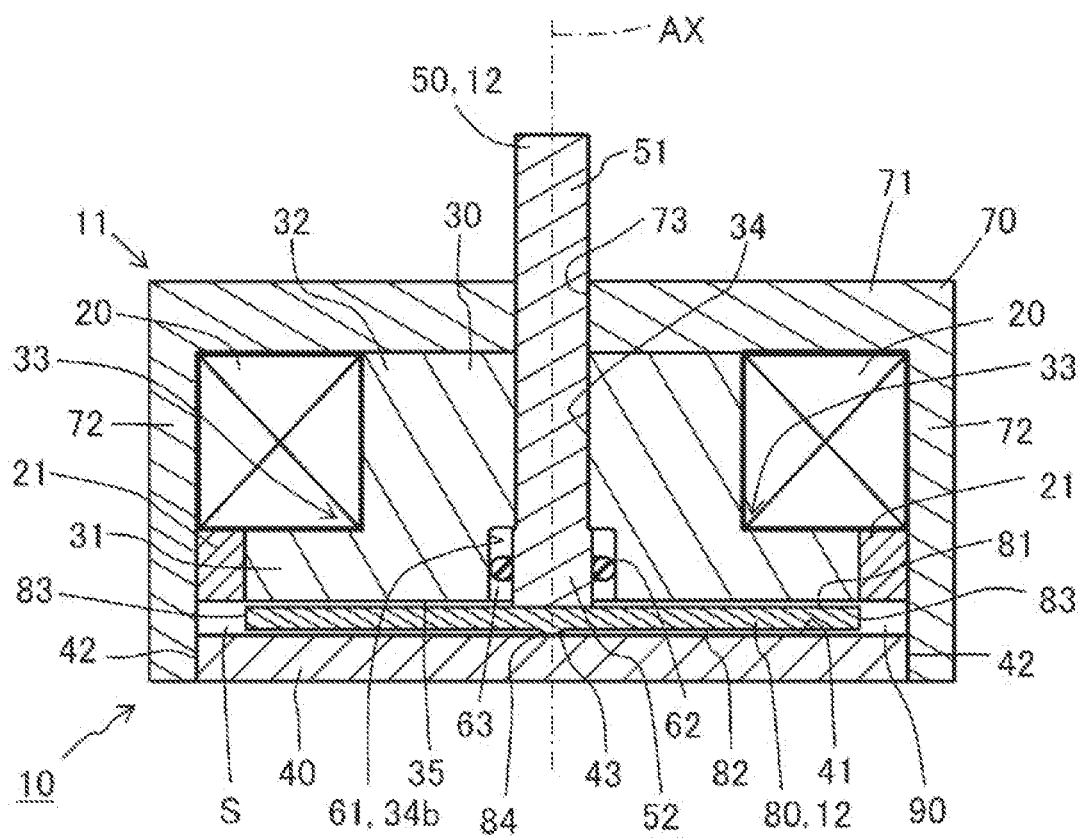
FIG. 2A is a cross-sectional view illustrating an outline configuration of the torque generation device according to the first embodiment.
Figure 2B:
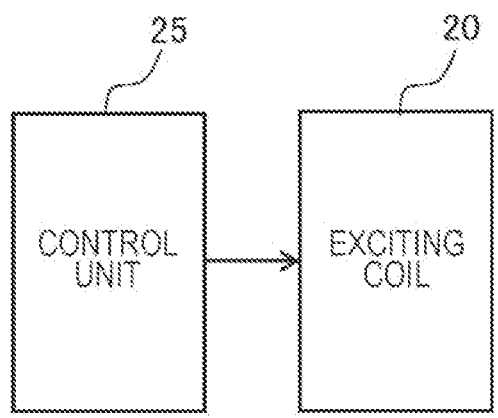
FIG. 2B is a functional block diagram illustrating a control system of the torque generation device according to the first embodiment.
Figure 3:
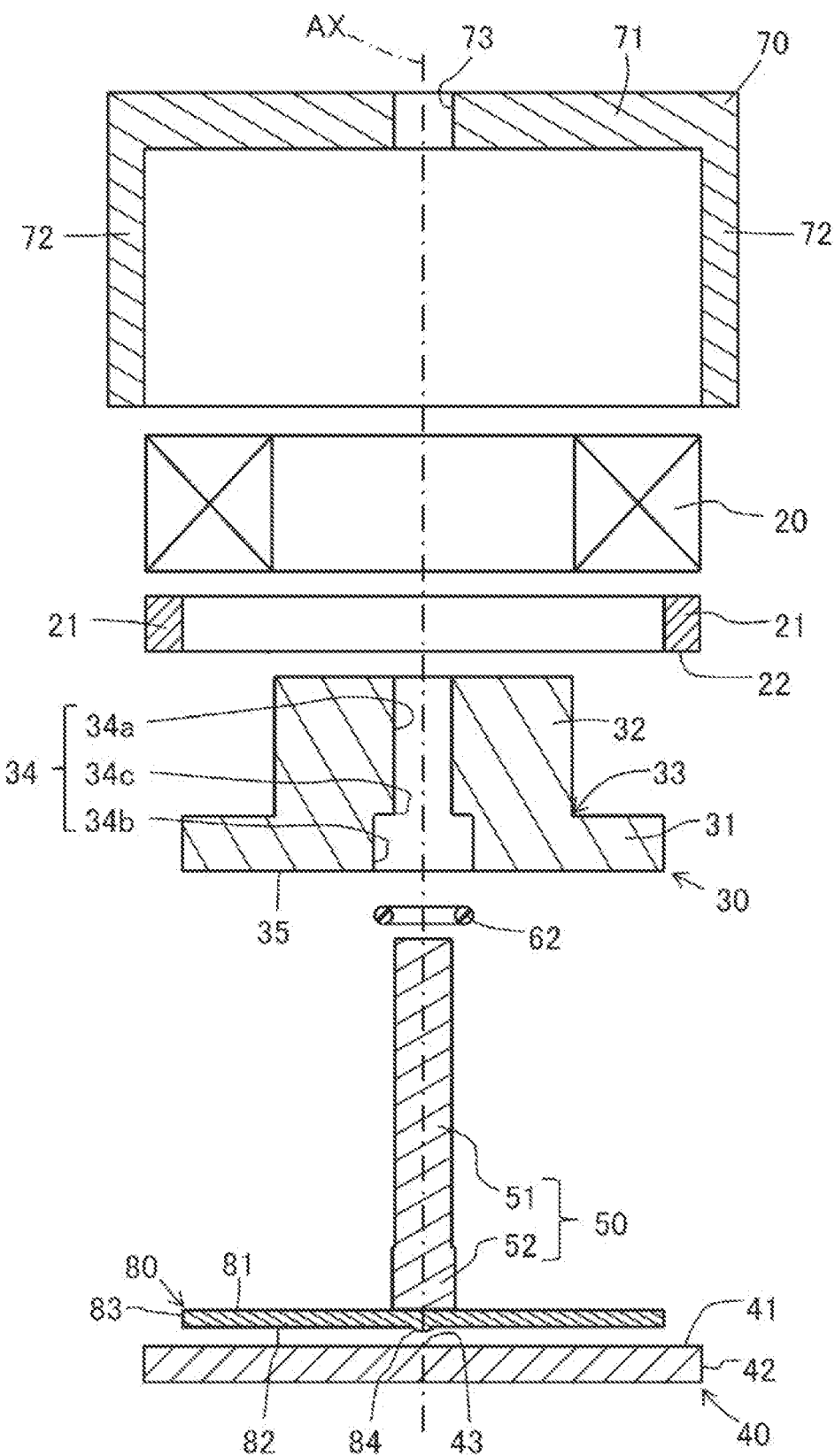
FIG. 3 is an exploded cross-sectional view of the torque generation device illustrated in FIG. 2A.
Figure 4:
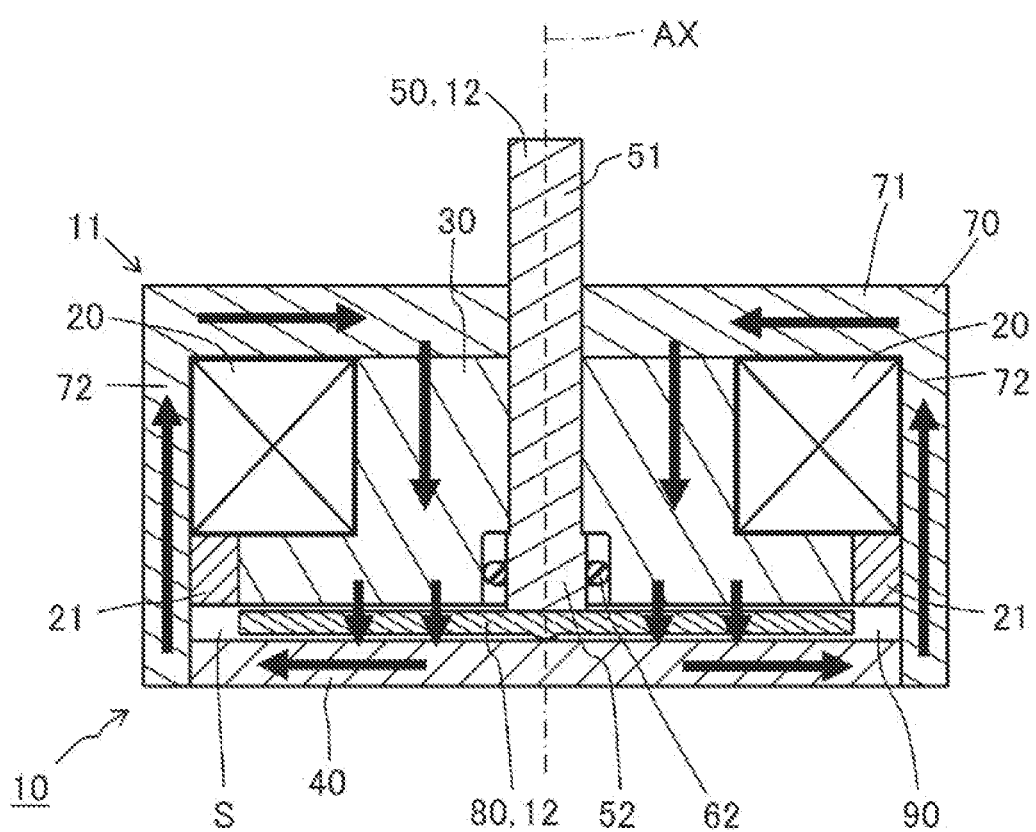
FIG. 4 is an explanatory view conceptually illustrating a magnetic field generated by an exciting coil in the torque generation device illustrated in FIG. 3.
Figure 5:
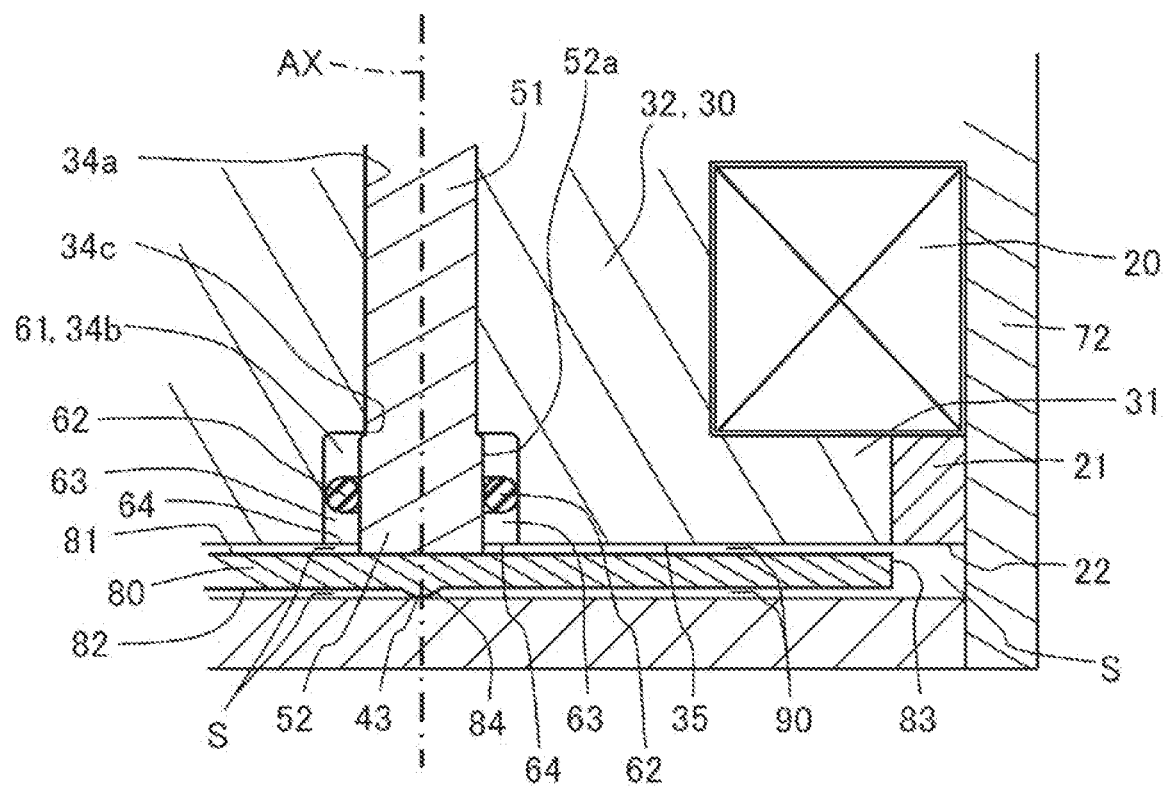
FIG. 5 is a partially enlarged view of FIG. 2A.

FIG. 1A is a perspective view of a torque generation device 10 according to the first embodiment viewed from an upper side, and FIG. 1B is a perspective view of the torque generation device 10 viewed from a lower side. FIG. 2A is a cross-sectional view illustrating an outline configuration of the torque generation device 10, and FIG. 2B is a functional block diagram illustrating a control system of the torque generation device 10. FIG. 2A is a cross-sectional view taken along line IIA-IIA in FIG. 1A. FIG. 3 is an exploded cross-sectional view of the torque generation device 10 illustrated in FIG. 2A. FIG. 4 is an explanatory view conceptually illustrating a magnetic field generated by an exciting coil 20 in the torque generation device 10 illustrated in FIG. 3 by using arrows. FIG. 5 is a partially enlarged view of FIG. 2A.

Although an up-down direction is defined along a rotary axis AX for convenience of description in the drawings, this does not limit a direction during actual use. A direction along the rotary axis AX is referred to as an axial direction or an up-down direction, and a direction orthogonal to the rotary axis AX is referred to as a radial direction. Hereinafter, viewing a lower side from an upper side along the rotary axis AX is sometimes referred to as plan view.

As illustrated in FIG. 2A, the torque generation device 10 includes a holding unit 11 and an operating unit 12. The operating unit 12 includes a shaft 50 and a magnetic disc 80 and is supported by the holding unit 11 so as to be rotatable in both directions about the rotary axis AX of the shaft 50. The operating unit 12 is rotatably supported by the holding unit 11 at a first shaft bearing part 34c and a second shaft bearing part 43 (see FIG. 5). The holding unit 11 includes a first yoke 30 including the first shaft bearing part 34c, a second yoke 40 including the second shaft bearing part 43, a third yoke 70, an annular member 21, and the exciting coil 20 serving as a magnetic field generating unit. The first yoke 30, the second yoke 40, the third yoke 70, and the annular member 21 constitute an external member.

Shaft 50 and Magnetic Disc 80

The shaft 50 is made of a non-magnetic body and includes a base part 51 having a cylindrical shape having a constant diameter and a large-diameter part 52 provided at a lower end of the base part 51 in the axial direction and having a larger diameter than the base part 51.

The magnetic disc 80 serving as a rotor is fixed to a bottom surface of the shaft 50 (a bottom surface of the large-diameter part 52). The magnetic disc 80 is disposed so that a central axis thereof matches the rotary axis AX, and an upper surface 81 and a lower surface 82 thereof are perpendicular to the rotary axis AX. The magnetic disc 80 is a rotating plate that is rotatable about the rotary axis AX together with the shaft 50.

The magnetic disc 80 has, at a center of the lower surface 82, a protruding part 84 that protrudes downward.

External Member

The external member is disposed outside the magnetic disc 80. A region outside the magnetic disc 80 includes a region above the upper surface 81 and a region below the lower surface 82 in the up-down direction and a region outside an outer circumferential edge 83 in the radial direction.

The external member includes the first yoke 30, the second yoke 40, the third yoke 70, and the annular member 21, the first yoke 30 is disposed so as to cover an upper side of the magnetic disc 80, the second yoke 40 is disposed below the magnetic disc 80, and the third yoke 70 is disposed so as to cover an upper side of the first yoke 30 and an outer side of the magnetic disc 80 in the radial direction. The first yoke 30, the second yoke 40, and the third yoke 70 are made of a magnetic material such as iron or steel.

First Yoke 30 (External Member)

The first yoke 30 includes an annular part 31 and a cylindrical part 32 that is provided integrally with the annular part 31 so as to extend upward from an upper surface of the annular part 31 concentrically with the annular part 31. The annular part 31 and the cylindrical part 32 each have a circular shape whose center is located at the rotary axis AX in plan view, and an external diameter of the cylindrical part 32 is smaller than an external diameter of the annular part 31. Due to the difference in external diameter between the annular part 31 and the cylindrical part 32, a step part 33 is formed on an outer side of an outer circumferential surface of the cylindrical part 32.

The first yoke 30 has a central hole 34 whose center is located at the rotary axis AX and that has a circular shape in plan view into which the shaft 50 can be inserted. The central hole 34 includes a first hole 34a and a second hole 34b that have different inner diameters that are arranged along a direction of the rotary axis AX with the first shaft bearing part 34c interposed therebetween. The first shaft bearing part 34c is provided at a substantially same position as the step part 33 in the axial direction.

The first hole 34a has an inner diameter substantially identical to the diameter of the base part 51 of the shaft 50. The second hole 34b has a larger inner diameter than the large-diameter part 52 so that a containing space 61 (FIGS. 2A and 5) is formed between the second hole 34b and the large-diameter part 52 of the shaft 50, and forms a recess of the external member recessed outward in the radial direction beyond the first hole 34a.

When the shaft 50 is inserted into the central hole 34, a step part between the base part 51 and the large-diameter part 52 makes contact with the first shaft bearing part 34c, and therefore the shaft 50 is supported from an outer side in the radial direction by the first shaft bearing part 34c and is rotatable relative to the first yoke 30.

A lower surface of the first yoke 30 is a first opposed surface 35 that serves as a first opposed part that faces the upper surface 81 of the magnetic disc 80. The first opposed surface 35 expands from a position of the second hole 34b of the central hole 34 to a position corresponding to the outer circumferential edge 83 of the magnetic disc 80 in the radial direction.

Second Yoke 40 (External Member)

The second yoke 40 has a substantially circular plate shape and is disposed below the lower surface 82 of the magnetic disc 80. An upper surface of the second yoke 40 is a second opposed surface 41 that serves as a second opposed part that faces the lower surface 82 of the magnetic disc 80. Therefore, the first opposed surface 35 serving as the first opposed part faces one surface (the upper surface 81) of the magnetic disc 80, and the second opposed surface 41 serving as the second opposed part faces the other surface (the lower surface 82) of the magnetic disc 80.

The second shaft bearing part 43 that receives the protruding part 84 of the magnetic disc 80 is provided at a center of the second yoke 40 in the radial direction. Although the second shaft bearing part 43 is simplified in the drawings, the second shaft bearing part 43 is preferably a recess recessed downward from the second opposed surface 41 or a hole passing through the second yoke 40 from top to bottom in conformity with the shape of the protruding part 84. The protruding part 84 of the magnetic disc 80 is supported by the second shaft bearing part 43, and thus the shaft 50 and the magnetic disc 80 are supported in the axial direction.

Third Yoke 70 (External Member)

The third yoke 70 includes an upper wall part 71 that covers the first yoke 30 and makes contact with an upper surface of the first yoke 30 and a side wall part 72 that extends downward from an outer periphery of the upper wall part 71. The shape of the upper wall part 71 in plan view is not limited to a rectangular shape like the one illustrated in FIGS. 1A and 1B and can be, for example, a circular shape.

The third yoke 70 has a through-hole 73 having a substantially cylindrical shape in a region including the rotary axis AX (FIG. 2A). This through-hole 73 passes through the third yoke 70 in the up-down direction. As illustrated in FIG. 2A, a space in the through-hole 73 is communicated with a space surrounded by the central hole 34 of the first yoke 30 in the up-down direction, and the shaft 50 can be inserted into the space in the through-hole 73.

Furthermore, an outer peripheral part 42 of the second yoke 40 in the radial direction is connected to an inner surface of the side wall part 72 of the third yoke 70. With this configuration, the magnetic disc 80 is sandwiched between the first yoke 30 and the second yoke 40, and an outer side of the magnetic disc 80 in the radial direction is surrounded by the third yoke 70.

Annular Member 21 (External Member)

The annular member 21 made of a non-magnetic material and having an annular shape is disposed between the first yoke 30 and the side wall part 72 of the third yoke 70 in the radial direction. The annular member 21 has a circular shape having an external diameter substantially identical to the exciting coil 20 disposed on the step part 33 in plan view. The annular member 21 is, for example, made of a thermosetting material which is a non-magnetic material, and is fixed between the first yoke 30 and the third yoke 70 in the radial direction and is fixed between the exciting coil 20 and the second yoke 40 in the axial direction. As illustrated in FIG. 5, the annular member 21 is disposed so that a lower surface 22 thereof is at the same height as the first opposed surface 35 of the first yoke 30 in the axial direction.

As illustrated in FIGS. 2A and 5, the magnetic disc 80 is disposed so that the upper surface 81 is separated from the first opposed surface 35 of the first yoke 30 and the lower surface 22 of the annular member 21 and the outer circumferential edge 83 is separated from the side wall part 72 of the third yoke 70. Furthermore, the magnetic disc 80 is disposed so that the lower surface 82 is separated from the second opposed surface 41 of the second yoke 40 excluding the second shaft bearing part 43.

This forms a continuous gap S between the magnetic disc 80 and the first opposed surface 35 of the first yoke 30, the annular member 21, the side wall part 72 of the third yoke 70, and the second opposed surface 41 of the second yoke 40 that surround the magnetic disc 80. In this gap S, a magnetorheological fluid 90 is disposed as a magnetically responsive material. The gap S may be filled with the magnetorheological fluid 90 only but may contain air as long as resistance to the shaft 50 is assured.

As described above, the shaft 50 is supported from an outer side in the radial direction by the first shaft bearing part 34c of the central hole 34, and the magnetic disc 80 fixed to the shaft 50 is supported by the second shaft bearing part 43 of the second yoke 40 in the axial direction of the rotary axis AX. Accordingly, the shaft 50 and the magnetic disc 80 are stably rotatable about the rotary axis AX relative to the first yoke 30 and the second yoke 40 that constitute the external member.

Magnetic Field Generating Unit

The exciting coil 20 having an annular shape wound about the rotary axis AX is disposed on the step part 33 of the first yoke 30 between the first yoke 30 and the third yoke 70 in the radial direction. The exciting coil 20 is disposed in a range corresponding to an outer portion of the magnetic disc 80 including the outer circumferential edge 83 of the magnetic disc 80 and the annular member 21 in the radial direction. The exciting coil 20 faces the magnetic disc 80 with the first yoke 30 and the annular member 21 interposed therebetween in the axial direction.

The exciting coil 20 as a magnetic field generating unit generates a magnetic field by a current from a control unit 25 (FIG. 2B). The control unit 25 controls a magnitude of a current applied to the exciting coil 20 and thereby controls a magnitude of a magnetic field generated by the exciting coil 20. The control unit 25 includes, for example, a current passing unit that passes a current through a coil, a central processing unit, and a storage device, receives power from a power source, and executes control by causing the central processing unit to execute a program stored in the storage device.

In FIGS. 2A and 3 through 5, a wire between the control unit 25 and the exciting coil 20 is omitted.

The exciting coil 20 is surrounded by the first yoke 30 and the third yoke 70 on inner and outer sides in the radial direction, is surrounded by the second yoke 40 on a lower side, and is surrounded by the third yoke 70 on an upper side. Accordingly, the magnetic field generated by the exciting coil 20 is guided through a path formed by the first yoke 30, the second yoke 40, and the third yoke 70 to form a magnetic circuit.

When a current is applied to the exciting coil 20, a magnetic field having lines of magnetic force indicated by the arrows in FIG. 4 is generated. Lines of magnetic force along the radial direction are generated in the second yoke 40, and lines of magnetic force along the up-down direction are generated in the side wall part 72 of the third yoke 70. Furthermore, lines of magnetic force opposite to the lines of magnetic force in the second yoke 40 and along the radial direction are generated in the upper wall part 71 of the third yoke 70, and lines of magnetic force opposite to the lines of magnetic force in the side wall part 72 and along the up-down direction are generated in the first yoke 30. Accordingly, lines of magnetic force pass the magnetic disc 80 in the up-down direction.

By disposing the annular member 21, the first yoke 30 and the side wall part 72 of the third yoke 70 are magnetically separated below the exciting coil 20. Accordingly, no line of magnetic force passes between the first yoke 30 and the side wall part 72 of the third yoke 70 in the radial direction, and lines of magnetic force flow in the first yoke 30 along the up-down direction and these lines of magnetic force efficiently cross the magnetic disc 80 in the up-down direction.

Note that in a case where a current is passed through the exciting coil 20 in an opposite direction, lines of magnetic force opposite to the lines of magnetic force illustrated in FIG. 4 are generated.

The lines of magnetic force of the magnetic field illustrated in FIG. 4 pass the magnetorheological fluid 90 in the gap S, a magnetic flux along the up-down direction crosses the magnetic disc 80, and no magnetic flux along the radial direction is not generated in the magnetorheological fluid 90 or even if a magnetic flux along the radial direction is generated in the magnetorheological fluid 90, a density of the magnetic flux is small.

The magnetorheological fluid 90 is a substance whose viscosity changes upon application of a magnetic field and is, for example, a fluid obtained by dispersing particles (magnetic particles) made of a magnetic material in a non-magnetic liquid (solvent). The magnetic particles contained in the magnetorheological fluid 90 are preferably, for example, carbon-containing iron-based particles or ferrite particles. A diameter of the magnetic particles is preferably, for example, 0.5 μm or more, more preferably 1 μm or more. The solvent and the magnetic particles for the magnetorheological fluid 90 are desirably selected so that the magnetic particles are hard to precipitate by gravity. Furthermore, the magnetorheological fluid 90 desirably contains a coupling material that prevents precipitation of the magnetic particles.

When a magnetic field is generated in the magnetorheological fluid 90 by applying a current to the exciting coil 20, a magnetic field along the up-down direction is given to the magnetorheological fluid 90. This magnetic field causes the magnetic particles dispersed in the magnetorheological fluid 90 to gather along the lines of magnetic force, and the magnetic particles arranged along the up-down direction are magnetically coupled to one another to form a cluster. When force for rotating the shaft 50 about the rotary axis AX is given in this state, shear force acts on the coupled magnetic particles, and thereby the magnetic particles generate resistance (torque). This allows an operator to feel resistance as compared with a state where no magnetic field is generated.

Meanwhile, in a case where no magnetic field is generated by the exciting coil 20, the magnetic particles are dispersed in the solvent. Therefore, when the operator operates the shaft 50, the holding unit 11 rotates relative to the operating unit 12 without receiving large resistance.

Adjusting Unit

As illustrated in FIG. 5, the containing space 61 having a hollow annular shape is provided around an outer circumference of the shaft 50 between the second hole 34b of the central hole 34 of the first yoke 30 and the large-diameter part 52 of the shaft 50. In other words, the containing space 61 is provided between an outer circumferential surface 52a of the large-diameter part 52 of the shaft 50 and the recess of the first yoke 30 that constitutes the external member.

An O-ring 62 is disposed as an adjusting sealing member in the containing space 61. The O-ring 62 is a ring member made of a material having elasticity and is in close contact with an inner surface of the containing space 61, that is, an inner surface of the second hole 34b of the first yoke 30 and the outer circumferential surface 52a of the large-diameter part 52 of the shaft 50 so as to be movable while sliding up and down along the axial direction of the rotary axis AX.

The containing space 61 is continuous with the gap S through a connection part 64 serving as a path. The magnetorheological fluid 90 that is put into the gap S flows not only into the gap S but also into the containing space 61. Since the O-ring 62 is in close contact with the inner surface of the containing space 61, the magnetorheological fluid 90 that has flowed into the containing space 61 is stopped at a position in the containing space 61 where the O-ring 62 is provided and does not flow into a portion above this position.

A space of the containing space 61 below the position where the O-ring 62 is provided is an adjustment space 63. The containing space 61 including the adjustment space 63 is provided between the first shaft bearing part 34c and the first opposed surface 35 serving as the first opposed part in the axial direction. The adjustment space 63 included in the containing space 61 is formed so as to be surrounded by the outer circumferential surface 52a of the large-diameter part 52 of the shaft 50, the recess of the first yoke 30 constituting the external member, and the O-ring 62.

The containing space 61, the O-ring 62 serving as an adjusting sealing member, and the adjustment space 63 constitute an adjusting unit provided along the outer circumference of the shaft 50. The adjusting unit is provided between the shaft 50 and the external member in the radial direction. By providing such an adjusting unit, the magnetorheological fluid 90 is sealed in the gap S, the adjustment space 63 of the containing space 61, and the connection part 64 serving as a path connecting the gap S and the adjustment space 63.

When a volume of the magnetorheological fluid 90 changes, the O-ring 62 can move up and down in the containing space 61 while maintaining liquid-tightness of the adjustment space 63. Accordingly, a capacity of the adjustment space 63 is changeable in accordance with a change in volume of the magnetorheological fluid 90. Since the containing space 61 is provided so as to extend along the rotary axis AX, it is unnecessary to add a new member, and therefore the capacity of the adjustment space 63 in which the magnetorheological fluid 90 is sealed can be enlarged and reduced in a wide range in accordance with expansion and contraction of the volume of the magnetorheological fluid 90 without markedly changing a manufacturing process. It is therefore possible to give stable desired resistance (torque) to a rotor even in a case where a volume of a magnetically responsive material changes due to a change in temperature, a change over time, or the like.

Figure 6:
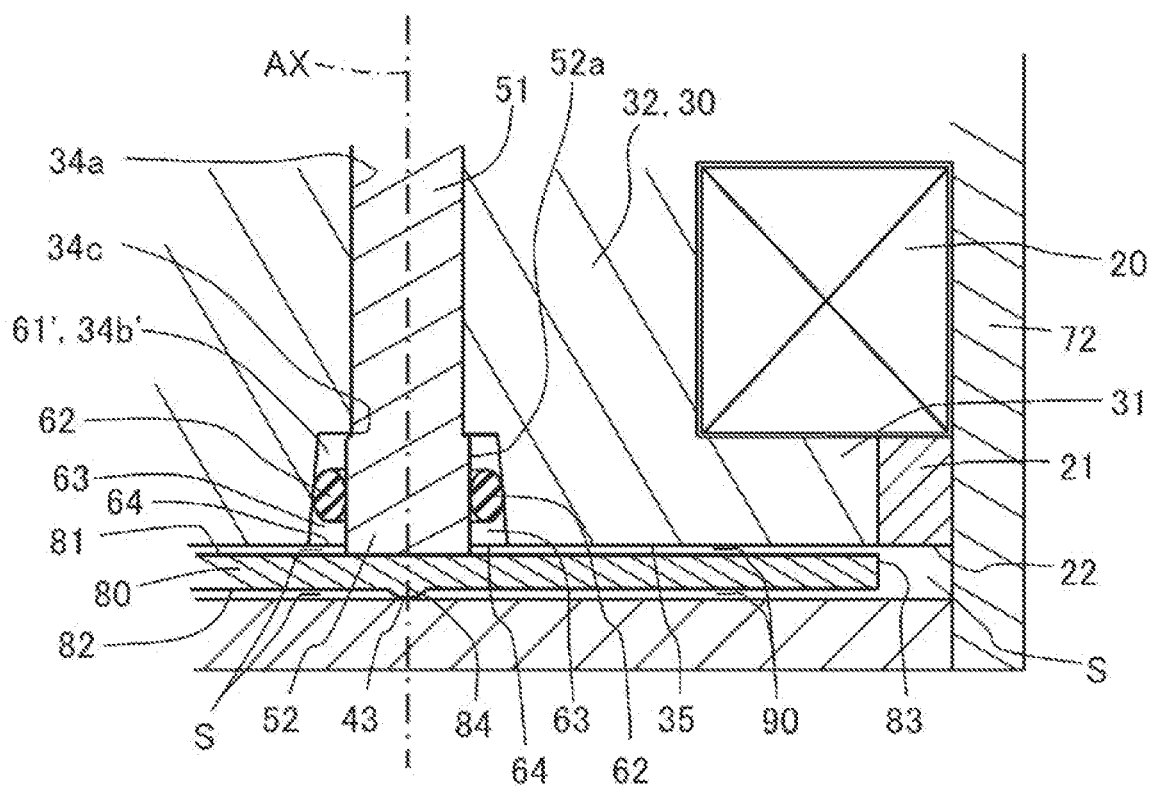
FIG. 6 is a cross-sectional view illustrating a part of an outline configuration of a torque generation device according to a modification in an enlarged manner.

The adjusting sealing member is not limited to the O-ring 62 and can be, for example, an X-ring. Furthermore, in a case where a second hole 34b' is formed so that an area of a containing space 61' in plan view becomes larger toward a lower side (magnetic disc 80 (rotor) side) as illustrated in FIG. 6 instead of the second hole 34b and the containing space 61, the O-ring 62 is easier to move toward the lower side when a pressure of the magnetorheological fluid 90 decreases, and therefore a change in position of the O-ring 62 according to a change in volume of the magnetorheological fluid 90 becomes smooth and speedy. FIG. 6 is a partially enlarged cross-sectional view of an outline configuration of a torque generation device according to a modification and illustrates a portion corresponding to FIG. 5.

Second Embodiment

Figure 7:
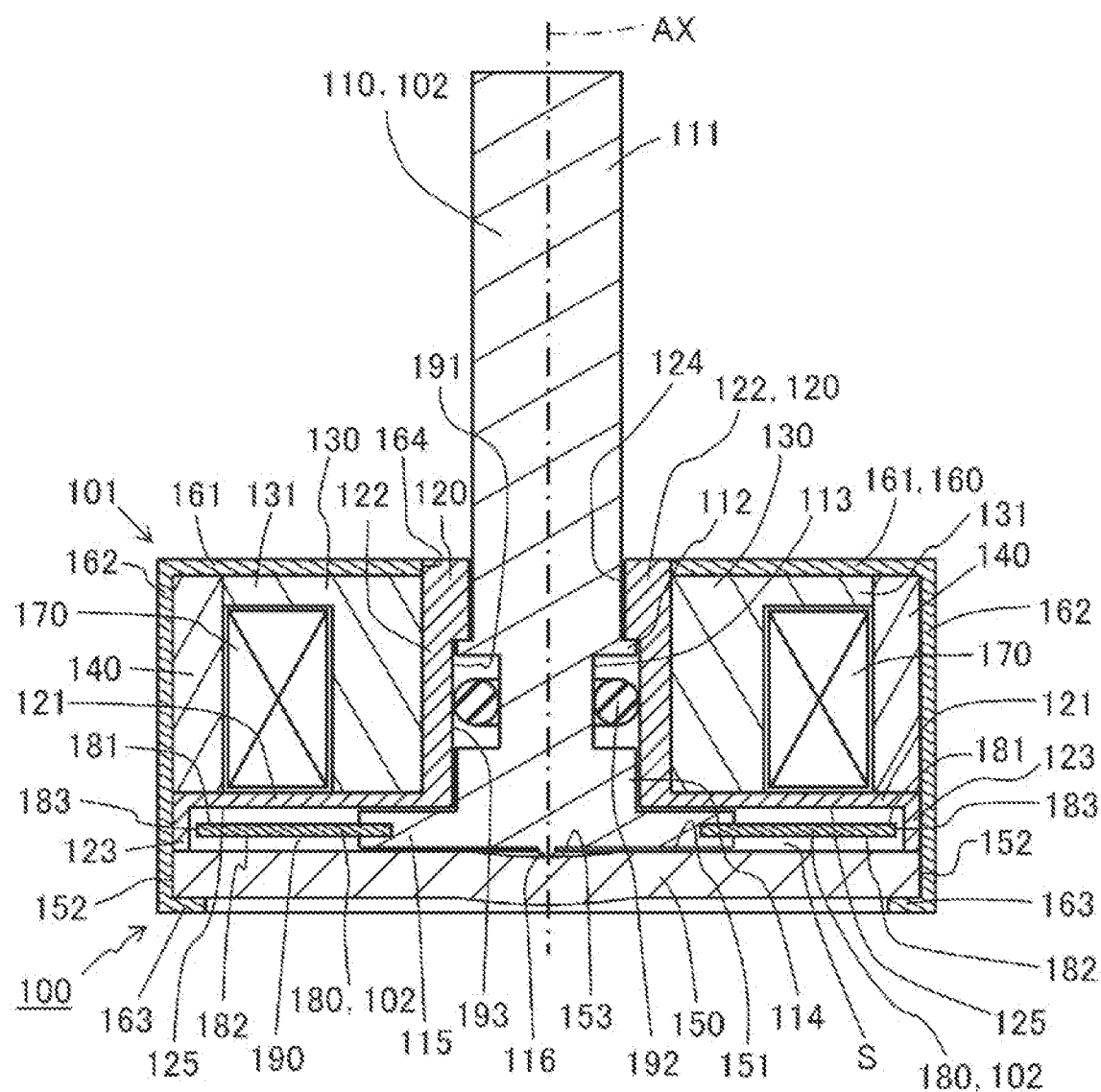
FIG. 7 is a cross-sectional view illustrating an outline configuration of a torque generation device according to a second embodiment.
Figure 8:
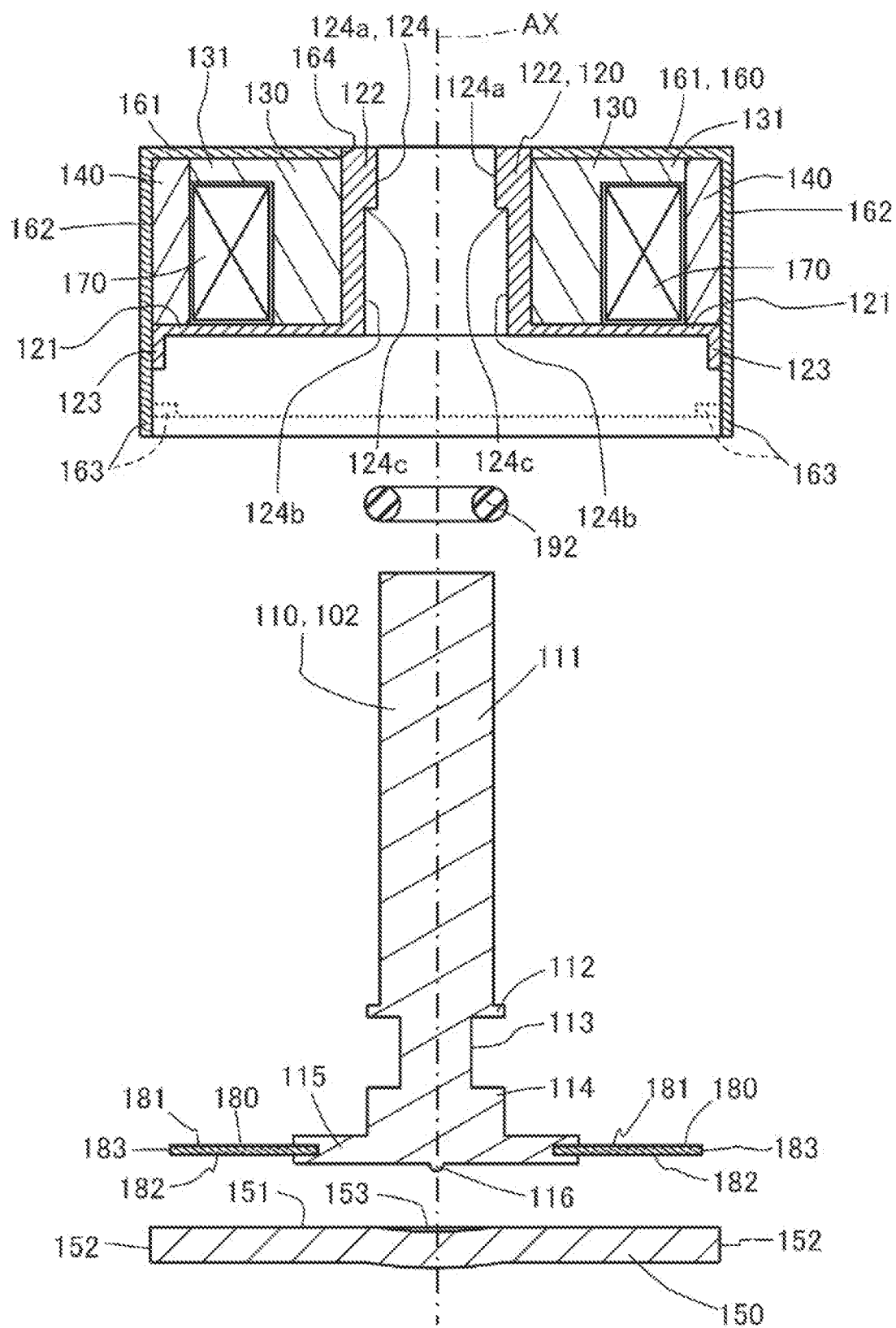
FIG. 8 is an exploded cross-sectional view of the torque generation device illustrated in FIG. 7.
Figure 9:
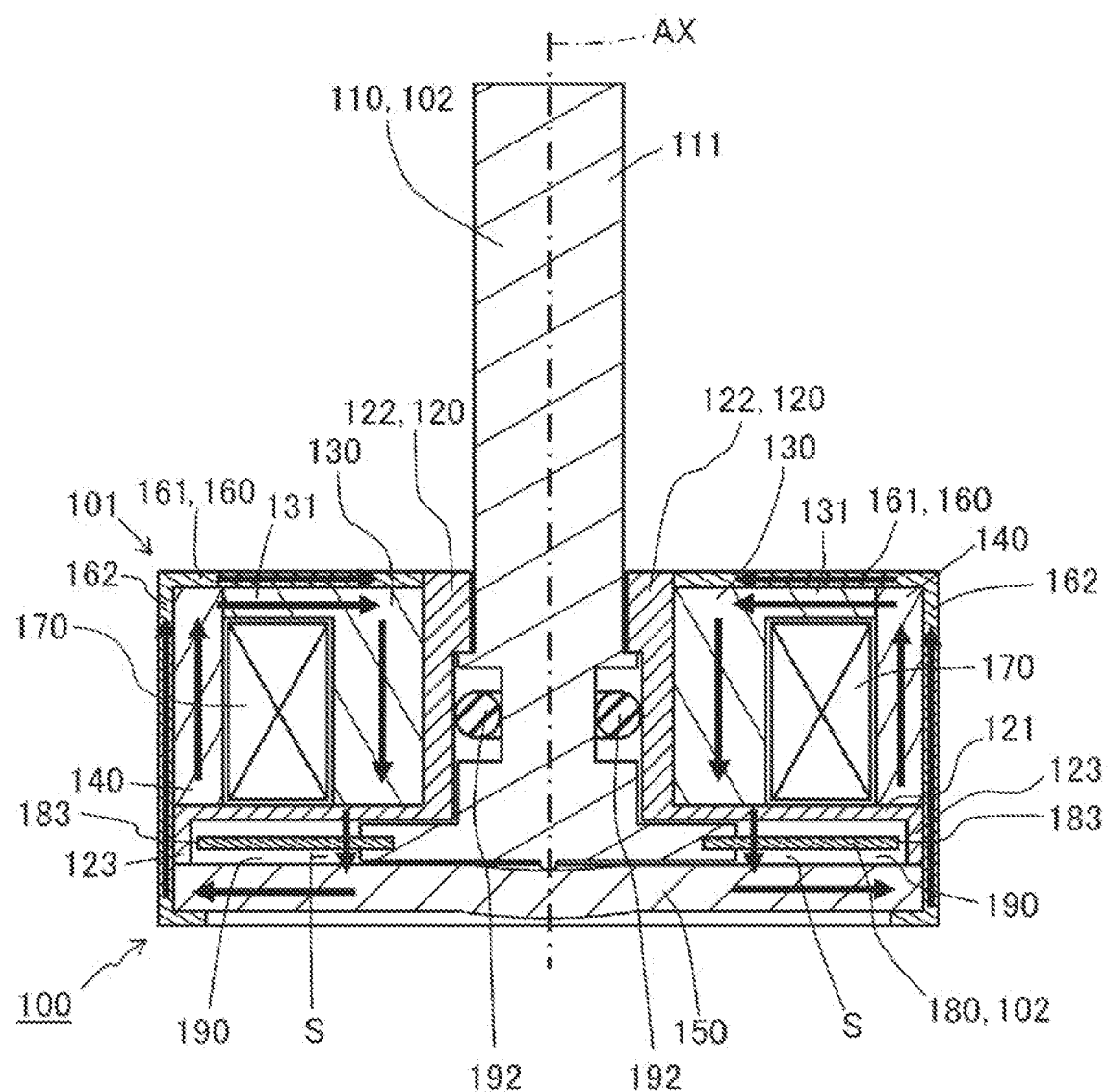
FIG. 9 is an explanatory view conceptually illustrating a magnetic field generated by an exciting coil in the torque generation device illustrated in FIG. 7.
Figure 10:
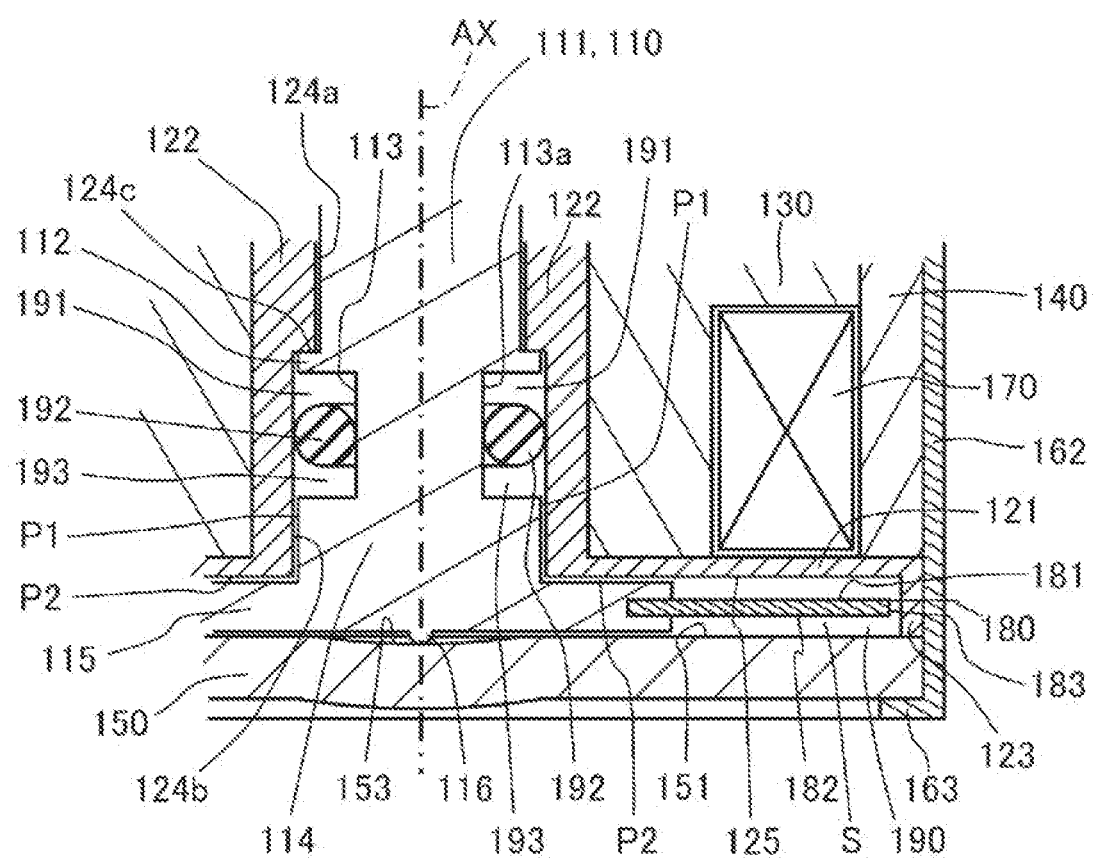
FIG. 10 is a partially enlarged view of FIG. 7.

FIG. 7 is a cross-sectional view illustrating an outline configuration of a torque generation device 100 according to the second embodiment. The torque generation device 100 has an external shape similar to the torque generation device 10 according to the first embodiment, and FIG. 7 is a cross-sectional view corresponding to FIG. 2. FIG. 8 is an exploded cross-sectional view of the torque generation device 100 illustrated in FIG. 7. FIG. 9 is an explanatory view conceptually illustrating lines of magnetic force of a magnetic field generated by an exciting coil 170 in the torque generation device 100 illustrated in FIG. 7 by using arrows. FIG. 10 is a partially enlarged view of FIG. 7. In the following description, detailed description of configuration, operation, and effects similar to those in the first embodiment is omitted.

As illustrated in FIG. 7, the torque generation device 100 includes a holding unit 101 and an operating unit 102. The operating unit 102 includes a shaft 110 and a magnetic disc 180 and is supported by the holding unit 101 so as to be rotatable in both directions about the rotary axis AX. The operating unit 102 is rotatably supported by the holding unit 101 at a first shaft bearing part 124c and a second shaft bearing part 153 (see FIG. 10). The holding unit 101 includes a first sealing member 120 including the first shaft bearing part 124c, an internal yoke 130 (first yoke), an external yoke 140, a second sealing member 150 including the second shaft bearing part 153, a housing 160, and an exciting coil 170 serving as a magnetic field generating unit. The first sealing member 120, the internal yoke 130, the external yoke 140, the second sealing member 150, and the housing 160 constitute an external member.

Shaft 110 and Magnetic Disc 180

The shaft 110 is made of a non-magnetic body and includes a base part 111, a flange part 112, a recessed part 113, a large-diameter part 114, and a circular plate part 115 provided continuously in this order from an upper side to a lower side (see FIG. 8). The base part 111 has a cylindrical shape having a constant diameter, and the flange part 112 expands outward in a brim shape from a lower end of the base part 111. The recessed part 113 is a small-diameter part provided so as to be recessed inward in the radial direction from a lower surface of the flange part 112 and has a diameter smaller than the base part 111. The large-diameter part 114 is provided at a lower end of the recessed part 113 and has a cylindrical shape having a diameter identical to the diameter of the flange part 112. The circular plate part 115 has a circular plate shape that expands outward from a lower end of the large-diameter part 114 and has a diameter larger than the diameter of the large-diameter part 114. Furthermore, the circular plate part 115 has, at a center of a lower surface thereof, a protruding part 116 that protrudes downward.

The magnetic disc 180 serving as a rotor is fixed to an outer peripheral part of the circular plate part 115 of the shaft 110. The magnetic disc 180 has an annular shape and is disposed so that a central axis thereof matches the rotary axis AX. An upper surface 181 and a lower surface 182 of the magnetic disc 180 are perpendicular to the rotary axis AX. The magnetic disc 180 is rotatable about the rotary axis AX together with the shaft 110.

External Member

The external member is disposed outside the magnetic disc 180. A region outside the magnetic disc 180 includes a region above the upper surface 181 and a region below the lower surface 182 in the up-down direction and a region outside an outer circumferential edge 183 in the radial direction.

The external member includes the first sealing member 120, the internal yoke 130, the external yoke 140, the second sealing member 150, and the housing 160. The first sealing member 120 is disposed so as to surround an upper side of the magnetic disc 180 and an outer side of the magnetic disc 180 in the radial direction, and the internal yoke 130 and the external yoke 140 are disposed so as to cover upper sides of the first sealing member 120 and the magnetic disc 180. The second sealing member 150 is disposed below the magnetic disc 180. The housing 160 is disposed so as to surround outer sides of the first sealing member 120, the internal yoke 130, the external yoke 140, and the second sealing member 150 that surround the magnetic disc 180. The first sealing member 120 is made of a non-magnetic material, and the internal yoke 130, the external yoke 140, the second sealing member 150, and the housing 160 are made of a magnetic material such as iron or steel.

First Sealing Member 120 (External Member)

The first sealing member 120 includes a circular plate part 121, a cylindrical part 122, and an annular part 123. The cylindrical part 122 is provided integrally with the circular plate part 121 having a thin plate shape so as to extend upward from an upper surface of the circular plate part 121 concentrically with the circular plate part 121. The annular part 123 is provided so as to extend downward from an outer edge of the circular plate part 121. The circular plate part 121 and the cylindrical part 122 have a circular shape whose center is located at the rotary axis AX in plan view, and an external diameter of the cylindrical part 122 is smaller than an external diameter of the circular plate part 121.

As illustrated in FIG. 7, the first sealing member 120 has a central hole 124 having a circular shape in plan view whose center is located at the rotary axis AX and into the shaft 110 can be inserted. As illustrated in FIG. 8, the central hole 124 includes a first hole 124a and a second hole 124b that have different inner diameters and are arranged in the rotary axis AX with the first shaft bearing part 124c interposed therebetween.

The first hole 124a has an inner diameter substantially identical to the diameter of the base part 111 of the shaft 110, and the second hole 124b has an inner diameter substantially identical to the flange part 112 and the large-diameter part 114 of the shaft 110. This forms a containing space 191 between the second hole 124b and the recessed part 113 of the shaft 110.

When the shaft 110 is inserted into the central hole 124, a step part between the base part 111 and the flange part 112 makes contact with the first shaft bearing part 124c, and therefore the shaft 110 is supported by the first shaft bearing part 124c from an outer side in the radial direction and is rotatable relative to the first sealing member 120.

As illustrated in FIG. 10, a gap P1 extending in the axial direction is provided between the cylindrical part 122 of the first sealing member 120 and the large-diameter part 114 of the shaft 110, and a gap P2 extending in the radial direction is provided between the circular plate part 121 of the first sealing member 120 and the circular plate part 115 of the shaft 110 so as to be continuous with the gap P1.

The circular plate part 121 of the first sealing member 120 serving as a first opposed part faces the upper surface 181 of the magnetic disc 180, and a lower surface of the circular plate part 121 is a first opposed surface 125 that faces the magnetic disc 180.

The annular part 123 is disposed so as to cover an outer side of the magnetic disc 180 in the radial direction, and a side wall part 162 of the housing 160 is disposed on an outer side of the annular part 123. Accordingly, the magnetic disc 180 and the housing 160 are magnetically isolated.

Internal Yoke 130 (External Member)

The internal yoke 130 serving as a first yoke is made of a magnetic material and is disposed on an upper side relative to the circular plate part 121 of the first sealing member 120 in the axial direction and is disposed on an outer side relative to the cylindrical part 122 in the radial direction. An upper part of the internal yoke 130 is a circular plate part 131 that expands in the radial direction above the exciting coil 170. According to this configuration, the internal yoke 130 is disposed so as to cover an inner side and an upper side of the exciting coil 170.

External Yoke 140 (External Member)

The external yoke 140 is an annular member disposed outside the internal yoke 130 in the radial direction with the exciting coil 170 interposed therebetween and is connected to an end surface of the circular plate part 131 of the internal yoke 130 on an outer side in the radial direction. Accordingly, the internal yoke 130 on an inner side of the exciting coil 170 in the radial direction and the external yoke 140 on an outer side of the exciting coil 170 in the radial direction are magnetically connected through the circular plate part 131.

Second Sealing Member 150 (External Member)

The second sealing member 150 has a substantially circular plate shape and is disposed below the circular plate part 115 of the shaft 110 and the magnetic disc 180 fixed to the circular plate part 115. An upper surface of the second sealing member 150 is a second opposed surface 151 serving as a second opposed part and faces the lower surface 182 of the magnetic disc 180.

The second sealing member 150 has, at a center thereof in the radial direction, the second shaft bearing part 153 that receives the protruding part 116 of the shaft 110. The second shaft bearing part 153 has a recessed shape recessed downward from the second opposed surface 151 in conformity with the shape of the protruding part 116. The protruding part 116 is supported by the second shaft bearing part 153, and thereby the shaft 110 and the magnetic disc 180 are supported in the axial direction.

Housing 160 (External Member)

The housing 160 is made of a magnetic material and includes an upper wall part 161 and a side wall part 162 extending downward from an outer periphery of the upper wall part 161. The upper wall part 161 is fixed so that an inner surface (lower surface) thereof is in contact with upper surfaces of the internal yoke 130 and the external yoke 140 and covers the upper surfaces of the internal yoke 130 and the external yoke 140. The side wall part 162 is fixed so that an inner surface thereof is in contact with the external yoke 140, an outer side surface of the annular part 123 of the first sealing member 120, and an outer circumferential surface 152 of the second sealing member 150. A front-end locking part 163 is provided at a lower end of the side wall part 162. A shape of the upper wall part 161 in plan view is not limited to a rectangular shape like the one illustrated in FIGS. 1A and 1B and may be, for example, a circular shape.

The housing 160 has a through-hole 164 having a substantially cylindrical shape in a region including the rotary axis AX (FIGS. 7 and 8). The through-hole 164 passes through the housing 160 in the up-down direction. The first sealing member 120 is inserted into the through-hole 164.

As illustrated in FIGS. 7 and 8, the housing 160 is mounted, from an upper side in the axial direction, onto the first sealing member 120, the internal yoke 130, the external yoke 140, and the exciting coil 170 that are fixed to one another. When the housing 160 is mounted, the side wall part 162 and the front-end locking part 163 of the housing 160 form a straight line extending along the axial direction (the solid line in FIG. 8).

Furthermore, the shaft 110 equipped with the O-ring 192 and the magnetic disc 180 in advance is inserted into the first sealing member 120, and then the second sealing member 150 is inserted into the housing 160 so as to be located below the shaft 110. In this state, the front-end locking part 163 is bent inward in the radial direction (the state indicated by the broken line in FIG. 8). In this way, the shaft 110 and the second sealing member 150 are mounted in the housing 160 (the state of FIG. 7).

By such a mounting step, the magnetic disc 180 is sandwiched between the internal yoke 130 and the external yoke 140 and the second sealing member 150 from upper and lower sides and is surrounded by the housing 160 with the annular part 123 made of a non-magnetic material interposed therebetween in the radial direction.

As illustrated in FIGS. 7 and 10, the magnetic disc 180 is disposed so that the upper surface 181 is separated from the first opposed surface 125 (the circular plate part 121) of the first sealing member 120 and the outer circumferential edge 183 is separated from the annular part 123 of the first sealing member 120. Furthermore, the magnetic disc 180 is disposed so that the lower surface 182 is separated from the second opposed surface 151 of the second sealing member 150.

This forms a continuous gap S between the magnetic disc 180 and the first opposed surface 125 (the circular plate part 121) of the first sealing member 120, the annular part 123, the second sealing member 150, and the large-diameter part 114 of the shaft 110 to which the magnetic disc 180 is fixed, which surround the magnetic disc 180. The magnetorheological fluid 190 is disposed as a magnetically responsive material in this gap S (FIG. 10).

As described above, the shaft 110 is supported by the first shaft bearing part 124c of the first sealing member 120 from an outer side in the radial direction, and the magnetic disc 180 fixed to the shaft 110 is supported by the second shaft bearing part 153 of the second sealing member 150 in the axial direction of the rotary axis AX. With this configuration, the shaft 110 and the magnetic disc 180 are stably rotatable about the rotary axis AX relative to the first sealing member 120, the internal yoke 130, the external yoke 140, the second sealing member 150, and the housing 160 that constitute the external member.

Instead of a procedure of sequentially mounting the members in the housing 160, it is also possible to employ a procedure of inserting the shaft 110 equipped with the O-ring 192 and the magnetic disc 180 in advance into the first sealing member 120, joining the second sealing member 150 to the annular part 123 of the first sealing member 120 so that the magnetorheological fluid 190 is sealed in the gap S, and then integrating these members with the housing 160 in which the internal yoke 130, the external yoke 140, and the exciting coil 170 are disposed.

Magnetic Field Generating Unit

The exciting coil 170 having an annular shape wound about the rotary axis AX is disposed on the circular plate part 121 of the first sealing member 120 between the internal yoke 130 and the external yoke 140 in the radial direction. The exciting coil 170 is disposed in a range corresponding to the magnetic disc 180 in the radial direction. The exciting coil 170 faces the magnetic disc 180 with the circular plate part 121 of the first sealing member 120 interposed therebetween in the axial direction.

The exciting coil 170 serving as a magnetic field generating unit generates a magnetic field by a current supplied from a control unit similar to the control unit 25 according to the first embodiment.

The exciting coil 170 is surrounded by the internal yoke 130 and the external yoke 140 from inner and outer sides in the radial direction and is surrounded by the circular plate part 131 and the second sealing member 150 of the internal yoke 130 from upper and lower sides. Furthermore, the exciting coil 170 is surrounded by the housing 160 from upper and lower sides and an outer side in the radial direction. Accordingly, a magnetic field generated by the exciting coil 170 is guided through a path (magnetic circuit) formed by the internal yoke 130, the external yoke 140, the second sealing member 150, and the housing 160.

When a current is applied to the exciting coil 170, a magnetic field having lines of magnetic force indicated by the arrows in FIG. 9 is generated. Lines of magnetic force along the radial direction are generated in the second sealing member 150, and lines of magnetic force along the up-down direction are generated in the side wall part 162 of the housing 160 and the external yoke 140. Furthermore, lines of magnetic force opposite to the lines of magnetic force in the second sealing member 150 and along the radial direction are generated in the upper wall part 161 of the housing 160 and the circular plate part 131 of the internal yoke 130, and lines of magnetic force opposite to the lines of magnetic force in the side wall part 162 of the housing 160 and the external yoke 140 and along the up-down direction are generated in the internal yoke 130. Accordingly, lines of magnetic force pass the magnetic disc 180 in the up-down direction.

Since the annular part 123 of the first sealing member 120 is disposed between the outer circumferential edge 183 of the magnetic disc 180 and the side wall part 162 of the housing 160, the magnetic disc 180 and the side wall part 162 are magnetically separated, and therefore no line of magnetic force passes in the radial direction between the magnetic disc 180 and the side wall part 162, lines of magnetic force flow along the up-down direction in the internal yoke 130, and these lines of magnetic force efficiently cross the magnetic disc 180 in the up-down direction.

Note that in a case where a current is passed through the exciting coil 170 in an opposite direction, lines of magnetic force opposite to the lines of magnetic force illustrated in FIG. 9 are generated.

The lines of magnetic force of the magnetic field illustrated in FIG. 9 pass the magnetorheological fluid 190 in the gap S, a magnetic flux along the up-down direction crosses the magnetic disc 180, and no magnetic flux along the radial direction is not generated in the magnetorheological fluid 190 or even if a magnetic flux along the radial direction is generated in the magnetorheological fluid 190, a density of the magnetic flux is small.

A magnetorheological fluid similar to that in the first embodiment is used as the magnetorheological fluid 190.

Adjusting Unit

As illustrated in FIG. 10, a containing space 191 having a hollow annular shape is provided between the second hole 124b of the first sealing member 120 constituting the external member and the recessed part 113 (small-diameter part) of the shaft 110. This containing space 191 is continuous with the gap S through the gaps P1 and P2 serving as paths.

An O-ring 192 is disposed as an adjusting sealing member in the containing space 191. The O-ring 192 is made of a material having elasticity and is in close contact with an inner surface of the containing space 191, that is, an inner surface of the second hole 124b of the first sealing member 120 and an outer circumferential surface 113a of the recessed part 113 of the shaft 110 so as to be slidable up and down along the axial direction of the rotary axis AX.

The magnetorheological fluid 190 that is put into the gap S flows not only into the gap S but also into the containing space 191 through the gaps P1 and P2 serving as paths. Since the O-ring 192 is in close contact with the inner surface of the containing space 191, the magnetorheological fluid 190 that has flowed into the containing space 191 is stopped at a position in the containing space 191 where the O-ring 192 is provided and does not flow into a portion above this position.

A space of the containing space 191 below the position where the O-ring 192 is provided is an adjustment space 193. The containing space 191 including the adjustment space 193 is provided between the first shaft bearing part 124c and the first opposed surface 125 in the axial direction.

The containing space 191, the O-ring 192 serving as an adjusting sealing member, and the adjustment space 193 constitute an adjusting unit provided along an outer circumference of the shaft 110. The adjusting unit is provided between the shaft 110 and the external member in the radial direction.

By providing such an adjusting unit, the magnetorheological fluid 190 is sealed in the gap S, the adjustment space 193 of the containing space 191, and the gaps P1 and P2 serving as paths connecting the gap S and the adjustment space 193.

When a volume of the magnetorheological fluid 190 changes, the O-ring 192 can move up and down in the containing space 191 while maintaining liquid-tightness of the adjustment space 193. Accordingly, a capacity of the adjustment space 193 is changeable in accordance with a change in volume of the magnetorheological fluid 190.

Other configuration, operation, and effects are similar to those in the first embodiment.

Third Embodiment

Figure 11A:
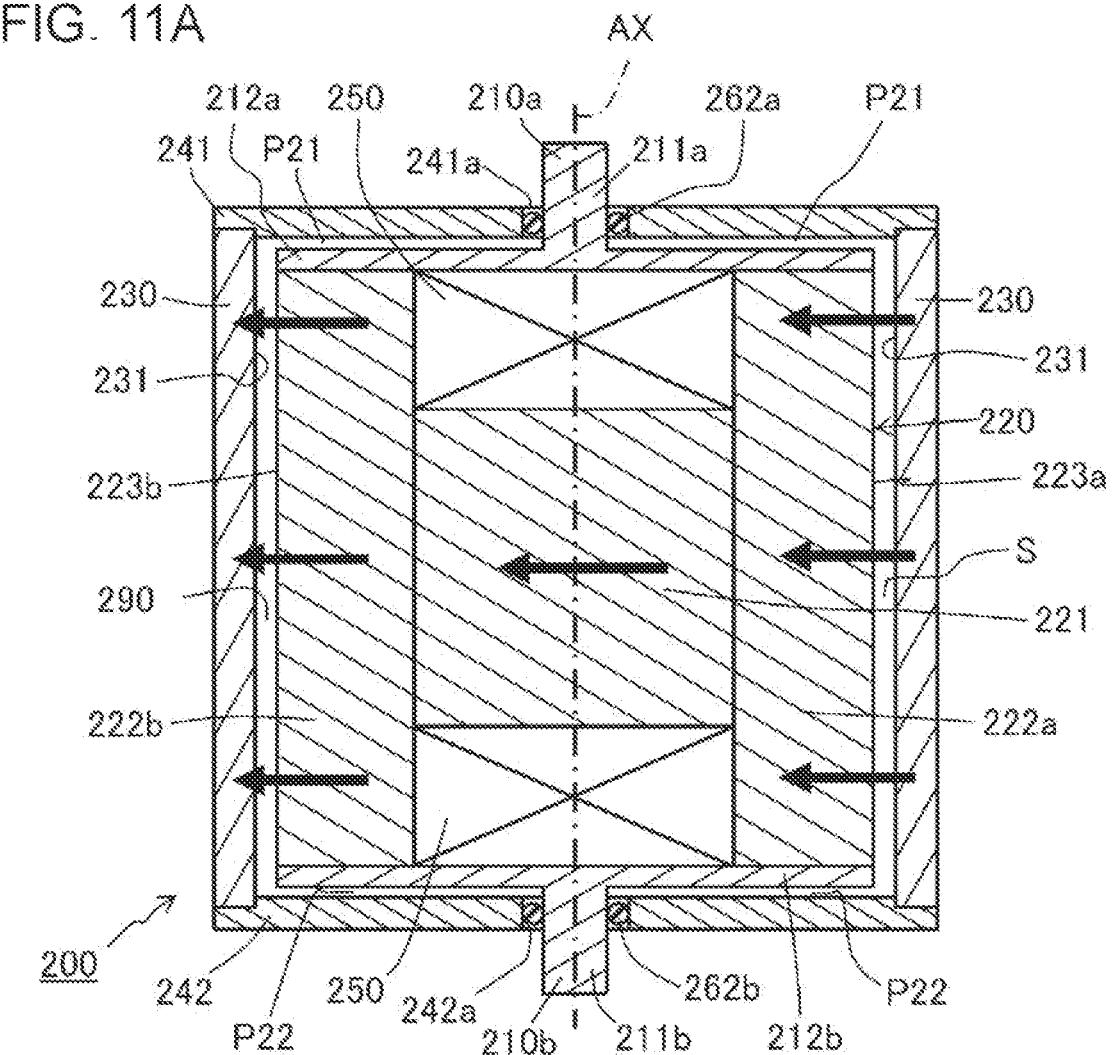
FIG. 11A is a cross-sectional view illustrating an outline configuration of a torque generation device according to a third embodiment.
Figure 11B:
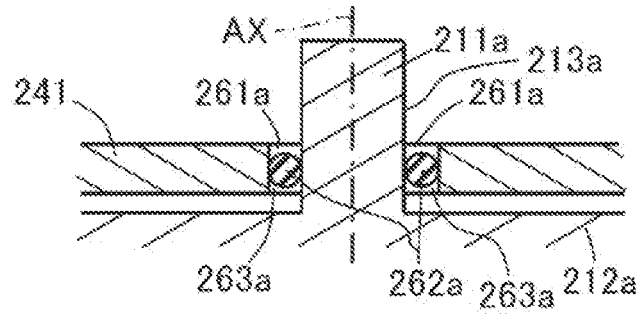
FIG. 11B is a partially enlarged view including one shaft in FIG. 11A.
Figure 11C:
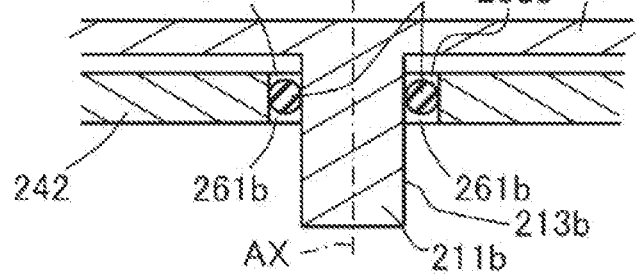
FIG. 11C is a partially enlarged view including the other shaft in FIG. 11A.

FIG. 11A is a cross-sectional view illustrating an outline configuration of a torque generation device 200 according to the third embodiment, FIG. 11B is an enlarged view of a part including a shaft 210a in FIG. 11A, and FIG. 11C is an enlarged view of a part including a shaft 210b in FIG. 11A. Although a magnetic disc is used as a rotor and lines of magnetic force of a magnetic field generated by an exciting coil crosses the magnetic disc in a direction along the rotary axis AX in the first embodiment and the second embodiment, a torque generation device 200 according to the third embodiment may be employed as an alternative form.

In the torque generation device 200 according to the third embodiment, two shafts 210a and 210b separate from each other in the up-down direction are used, and a rotor including an internal yoke 220 and an exciting coil 250 is fixed between these shafts. An external member disposed outside this rotor includes an external yoke 230 and a pair of fixing plates 241 and 242.

The two shafts 210a and 210b are made of a non-magnetic material and are integrated with each other with the internal yoke 220 and the exciting coil 250 interposed therebetween in the axial direction of the rotary axis AX. The shafts 210a and 210b are rotatable about the rotary axis AX together with the internal yoke 220 and the exciting coil 250. Accordingly, the internal yoke 220 and the exciting coil 250 rotate as a rotor about the rotary axis AX.

The shaft 210a disposed on an outer side in the axial direction includes a shaft part 211a extending along the axial direction and a circular plate part 212a that expands from a lower end of the shaft part 211a in the radial direction. Similarly, the shaft 210b disposed on a lower side in the axial direction includes a shaft part 211b extending along the axial direction and a circular plate part 212b that expands from an upper end of the shaft part 211b in the radial direction.

The internal yoke 220 is made of a magnetic material and includes a columnar core part 221 that extends in a direction orthogonal to the axial direction and two opposed parts 222a and 222b that are fixed to respective ends of the core part 221 and face each other with the rotary axis AX interposed therebetween.

The circular plate part 212a of the shaft 210a on the upper side is fixed to upper surfaces of the two opposed parts 222a and 222b, and the circular plate part 212b of the shaft 210b on the lower side is fixed to lower surfaces of the two opposed parts 222a and 222b. Outer surfaces of the two opposed parts 222a and 222b in the radial direction serve as outer circumferential surfaces 223a and 223b constituting a part of a circle in plan view, respectively.

The exciting coil 250 serving as a magnetic field generating unit is wound about a central axis (axis orthogonal to the rotary axis AX) of the columnar core part 221.

The external yoke 230 made of a magnetic material is disposed outside the internal yoke 220 serving as a rotor in the radial direction. The external yoke 230 has a hollow cylindrical shape whose center is located at the rotary axis AX, and an inner circumferential surface 231 of the external yoke 230 faces the outer circumferential surfaces 223a and 223b of the two opposed parts 222a and 222b with a gap S interposed therebetween. In this gap S, a magnetorheological fluid 290 is sealed as a magnetically responsive material.

The fixing plates 241 and 242 made of a non-magnetic material are fixed to an upper part and a lower part of the external yoke 230, respectively. The fixing plates 241 and 242 are circular plates whose centers are located at the rotary axis AX and have, at the centers thereof, holes 241a and 242a passing therethrough in the axial direction (thickness direction), respectively.

When a current is applied to the exciting coil 250, a magnetic field having lines of magnetic force indicated by the arrows in FIG. 11 is generated. These lines of magnetic force flow from the first opposed part 222a to the second opposed part 222b through the core part 221 and then flow from the second opposed part 222b to the external yoke 230 that faces the outer circumferential surface 223b. Furthermore, lines of magnetic force flowing from the external yoke 230 that faces the outer circumferential surface 223a of the first opposed part 222a toward the first opposed part 222a are generated. As a result, lines of magnetic force pass the gap S in the radial direction.

The shaft part 211a of the shaft 210a is inserted into the hole 241a of the fixing plate 241 on an upper side, and the shaft part 211b of the shaft 210b is inserted into the hole 242a of the fixing plate 242 on a lower side. A containing space 261a is formed between an inner circumferential surface of the hole 241a and an outer circumferential surface 213a (FIG. 11B) of the shaft part 211a, and a containing space 261b is formed between an inner circumferential surface of the hole 242a and an outer circumferential surface 213b (FIG. 11C) of the shaft part 211b.

An O-ring 262a similar to those in the first embodiment and the second embodiment is disposed as an adjusting sealing member in the containing space 261a on an upper side. The O-ring 262a is in close contact with the inner circumferential surface of the hole 241a and the outer circumferential surface 213a of the shaft part 211a so as to be slidable up and down along the axial direction. Furthermore, an O-ring 262b similar to those in the first embodiment and the second embodiment is disposed as an adjusting sealing member in the containing space 261b on a lower side. The O-ring 262b is in close contact with the inner circumferential surface of the hole 242a and the outer circumferential surface 213b of the shaft part 211b so as to be slidable up and down along the axial direction.

A gap P21 is provided between the fixing plate 241 and the circular plate part 212a that face each other. Similarly, a gap P22 is provided between the fixing plate 242 and the circular plate part 212b that face each other. The magnetorheological fluid 290 in the gap S is disposed in a space continuous with adjustment spaces 263a and 263b to the O-rings 262a and 262b in the containing spaces 261a and 261b through these gaps P21 and P22 serving as paths.

The containing space 261a on an upper side, the O-ring 262a, and the adjustment space 263a and the containing space 261b on a lower side, the O-ring 262b, and the adjustment space 263b constitute adjusting units provided around outer circumferences of the shafts 210a and 210b. The adjusting units are provided between the shafts 210a and 210b and the external member in the radial direction.

In the containing spaces 261a and 261b, the shafts 210a and 210b or the fixing plates 241 and 242 preferably have a recessed part as in the first embodiment and the second embodiment since movement ranges of the O-rings 262a and 262b can be regulated with certainty.

Since such adjusting units are provided, when a volume of the magnetorheological fluid 290 changes, the O-rings 262a and 262b can move up and down while maintaining liquid-tightness of the adjustment spaces 263a and 263b in the containing spaces 261a and 261b. Accordingly, capacities of the adjustment spaces 263a and 263b are changeable in accordance with a change in volume of the magnetorheological fluid 290.

Other configuration, operation, and effects are similar to those in the first or second embodiment.

Fourth Embodiment

Figure 12:
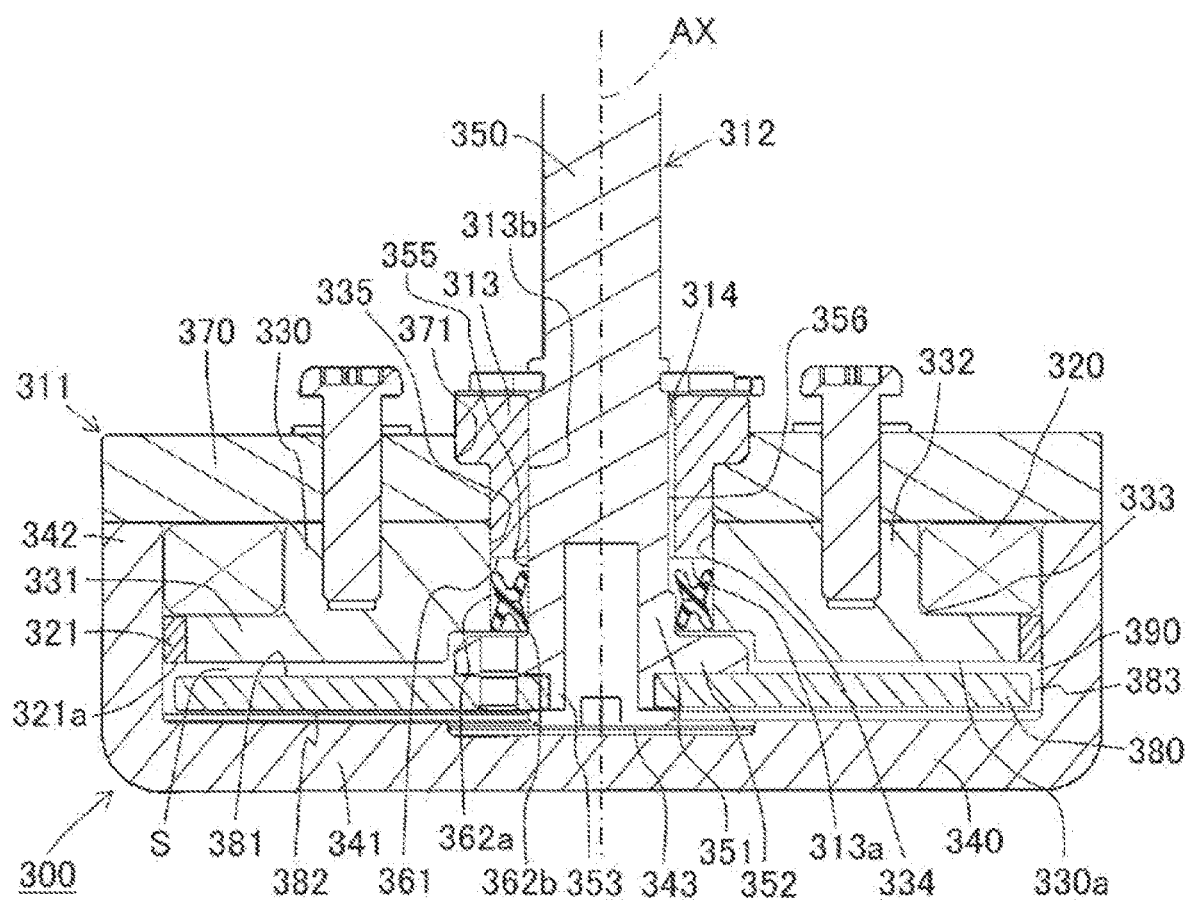
FIG. 12 is a cross-sectional view illustrating a configuration of a torque generation device according to a fourth embodiment taken along a rotary axis.
Figure 13A:
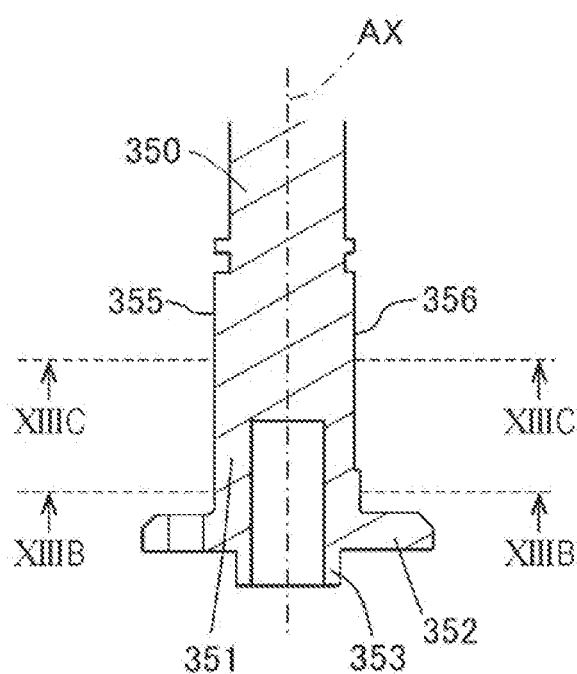
FIG. 13A is a cross-sectional view illustrating a configuration of a shaft taken along a rotary axis.
Figure 13B:
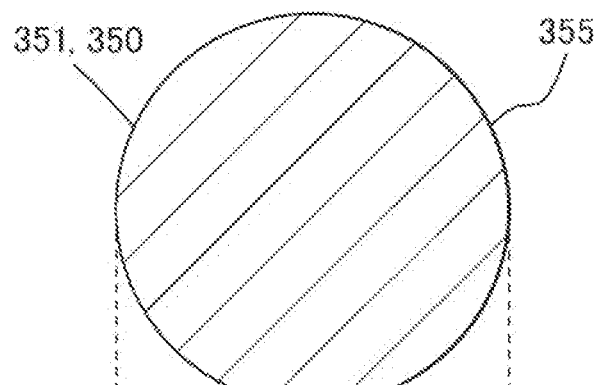
FIG. 13B is a cross-sectional view taken along line XIIIB-XIIIB in FIG. 13A.
Figure 13C:
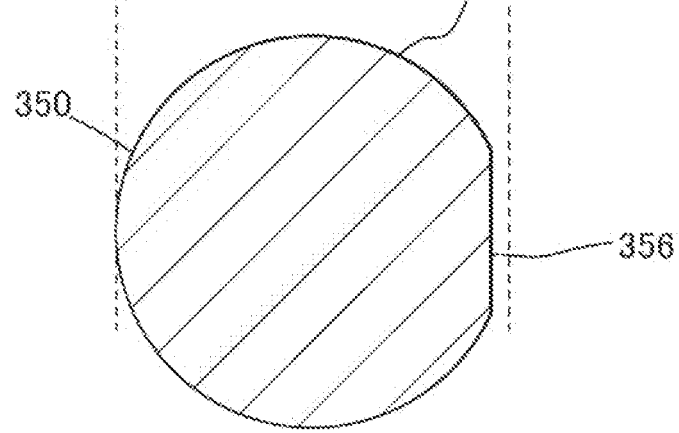
FIG. 13C is a cross-sectional view taken along line XIIIC-XIIIC in FIG. 13A.
Figure 14A:
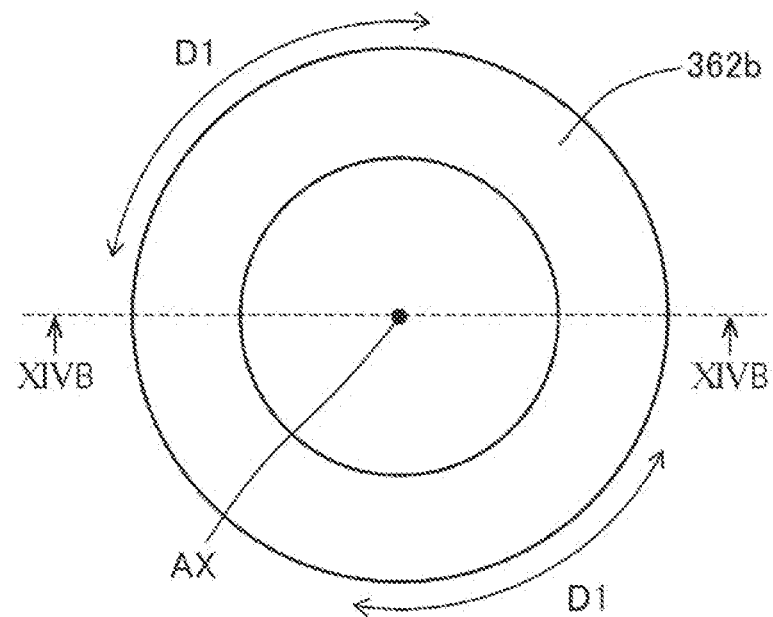
FIGS. 14A and 14B illustrate a configuration of a V-ring serving as an adjusting sealing member.
Figure 14B:
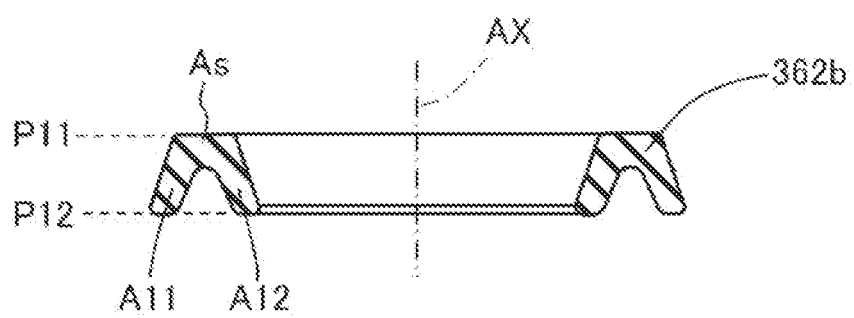
Figure 15A:
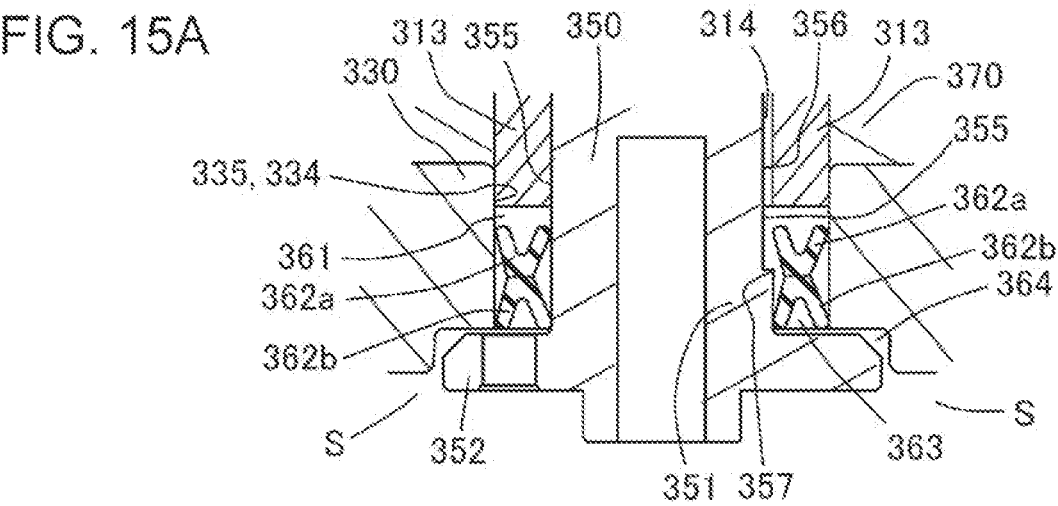
FIGS. 15A, 15B, and 15C are cross-sectional views illustrating a shaft, a guide part, a ventilation part, a containing space, two V-rings, and an adjustment space in an enlarged manner.
Figure 15B:
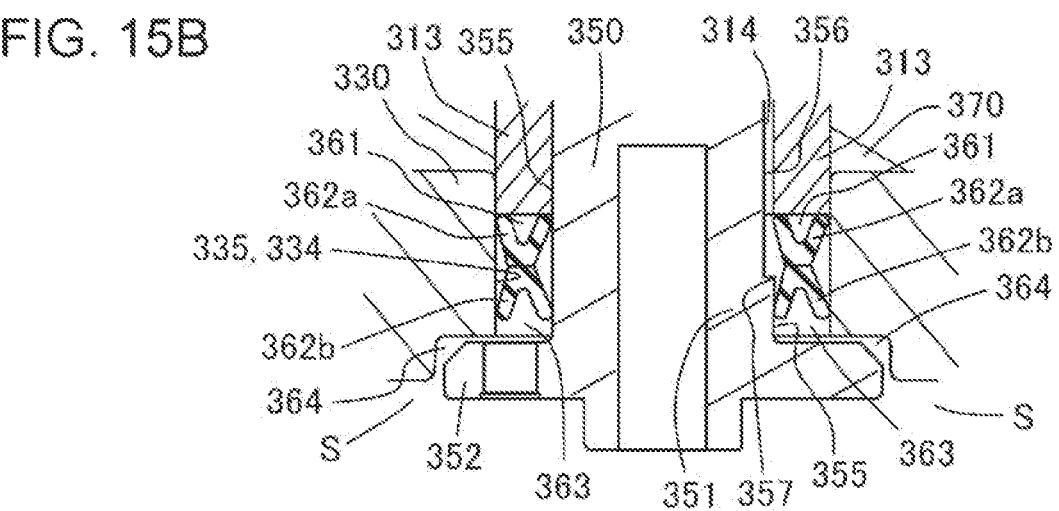
Figure 15C:
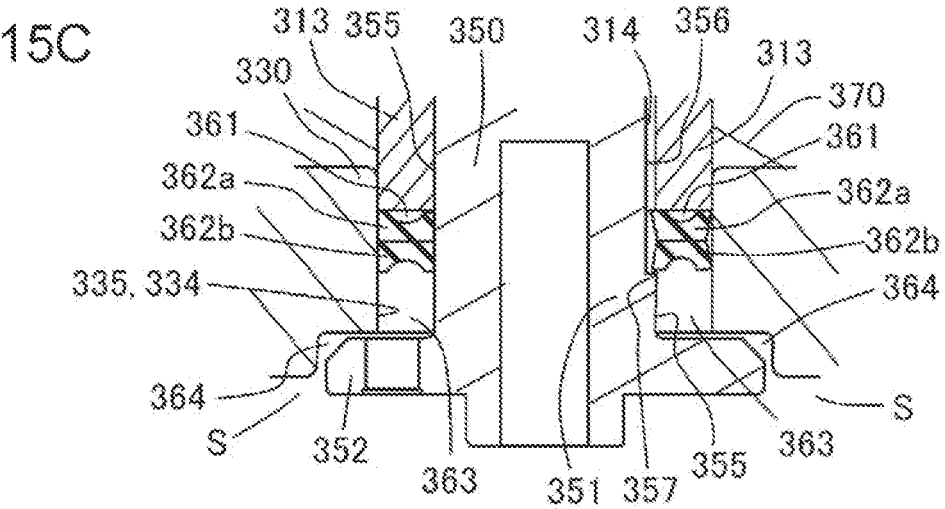
Figure 16A:
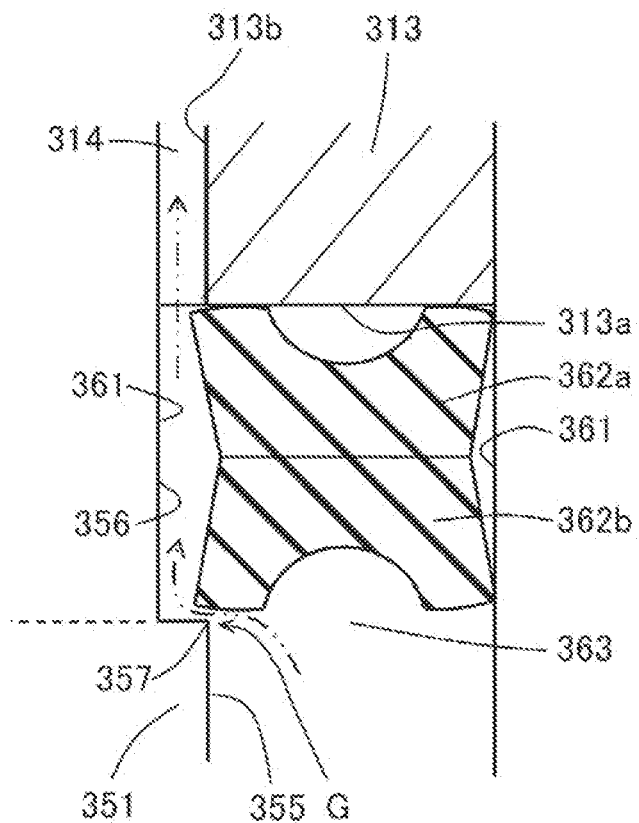
FIG. 16A is a partially enlarged view of FIG. 15C.
Figure 16B:
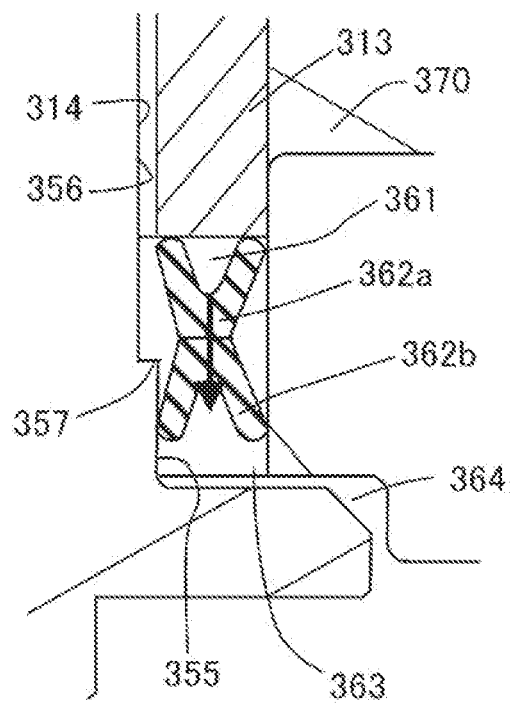
FIG. 16B is a cross-sectional view illustrating a state where air has flowed out from the adjustment space.

FIG. 12 is a cross-sectional view illustrating a configuration of a torque generation device 300 according to the fourth embodiment taken along the rotary axis AX, FIG. 13A is a cross-sectional view illustrating a configuration of a shaft 350 taken along the rotary axis AX, FIG. 13B is a cross-sectional view taken along line XIIIB-XIIIB in FIG. 13A, and FIG. 13C is a cross-sectional view taken along line XIIIC-XIIIC in FIG. 13A. FIGS. 14A and 14B illustrate a configuration of a V-ring 362b serving as an adjusting sealing member, FIG. 14A is a plan view, and FIG. 14B is a cross-sectional view taken along line XIVB-XIVB in FIG. 14A. FIGS. 15A, 15B, and 15C are cross-sectional views illustrating the shaft 350, a guide part 313, a ventilation part 314, a containing space 361, two V-rings 362a and 362b, and an adjustment space 363 in an enlarged manner. FIG. 15A is a partially enlarged view of FIG. 12 and illustrates a case where a volume of a magnetorheological fluid 390 is in an initial state. FIG. 15B illustrates a state where the volume of the magnetorheological fluid 390 has increased and the two V-rings 362a and 362b have been displaced upward until the two V-rings 362a and 362b make contact with a lower surface of the guide part 313, and FIG. 15C illustrates a state where the volume of the magnetorheological fluid 390 has further increased as compared with FIG. 15B and the two V-rings 362a and 362b have contracted beyond a predetermined position P3 (FIG. 16A). FIG. 16A is a partially enlarged view of FIG. 15C, and FIG. 16B is a cross-sectional view illustrating a state after air flows out from an adjustment space 363.

As illustrated in FIG. 12, the torque generation device 300 includes a holding unit 311 and an operating unit 312. The operating unit 312 includes the shaft 350 and a magnetic disc 380 and is supported by the holding unit 311 so as to be rotatable in both directions about the rotary axis AX of the shaft 350. The operating unit 312 is rotatably supported by the holding unit 311 at the guide part 313 and a shaft bearing part 343. The holding unit 311 includes the guide part 313, a first yoke 330, a second yoke 340 including the shaft bearing part 343, a third yoke 370, an annular member 321, and an exciting coil 320 serving as a magnetic field generating unit. The guide part 313, the first yoke 330, the second yoke 340, the third yoke 370, and the annular member 321 constitute an external member.

Shaft 350 and Magnetic Disc 380

The shaft 350 is made of a non-magnetic body and has a substantially cylindrical shape. As illustrated in FIG. 12 or FIG. 16A, the shaft 350 has, in a part inserted into the holding unit 311, a cutout part 356 formed in a range including a range corresponding to the guide part 313 and stretching to the predetermined position P3 in the containing space 361 whose upper limit is a bottom surface 313a of the guide part 313 in the axial direction. As illustrated in FIG. 13C, the cutout part 356 is obtained by cutting out a part of an outer circumferential surface 355 and forms a flat surface along the axial direction. The shaft 350 has the outer circumferential surface 355 having a circular shape in plan in a base part 351 below the predetermined position P3 (see FIGS. 13A, 13B, and 13C). At the predetermined position P3, a step part 357 serving as a displacing part that displaces an external diameter of the shaft 350 is formed by providing the cutout part 356. Furthermore, a flange part 352 that protrudes in the radial direction is provided below the base part 351, and a protruding part 353 that protrudes downward is provided in a central part of the flange part 352 in the radial direction.

As illustrated in FIG. 12, the magnetic disc 380 serving as a rotor is fixed to an outer circumferential surface of the protruding part 353 provided on a bottom of the shaft 350. The magnetic disc 380 is disposed so that a central axis thereof matches the rotary axis AX and an upper surface 381 and a lower surface 382 thereof are perpendicular to the rotary axis AX. The magnetic disc 380 is a rotating plate that is rotatable about the rotary axis AX together with the shaft 350 and is rotatably supported by the shaft bearing part 343 provided at a center of the second yoke 340 located below the magnetic disc 380.

External Member

The external member is disposed outside the magnetic disc 380. A region outside the magnetic disc 380 includes a region above the upper surface 381 and a region below the lower surface 382 in the up-down direction and a region outside the outer circumferential edge 383 in the radial direction.

The external member includes the guide part 313, the first yoke 330, the second yoke 340, the third yoke 370, and the annular member 321 (FIG. 12). The guide part 313 is disposed so that an inner circumferential surface 313b faces an outer circumferential surface of the shaft 350, and the first yoke 330 and the third yoke 370 are disposed outside the guide part 313. The first yoke 330 is disposed so as to cover an upper side of the magnetic disc 380, and the second yoke 340 is disposed so as to cover a lower side of the magnetic disc 380 and an outer side of the first yoke 330 in the radial direction. The third yoke 370 is disposed so as to cover upper sides of the first yoke 330 and the second yoke 340. The guide part 313 is made of a non-magnetic body, and the first yoke 330, the second yoke 340, and the third yoke 370 are made of a magnetic material such as iron or steel.

Guide Part 313 (External Member)

As illustrated in FIG. 12, the guide part 313 is a cylindrical member having the inner circumferential surface 313b having an inner diameter corresponding to the outer circumferential surface 355 of the shaft 350. The guide part 313 is disposed so that the inner circumferential surface 313b thereof is in contact with the outer circumferential surface 355 of the shaft 350. Accordingly, the shaft 350 is rotatably supported by the guide part 313 and is rotatable relative to the external member.

The guide part 313 has, in a part thereof that faces the cutout part 356 of the shaft 350, a ventilation part 314 that is a gap extending in the axial direction between the guide part 313 and the shaft 350. An upper side of the ventilation part 314 in the axial direction is communicated with an outside, and a lower side of the ventilation part 314 in the axial direction is continuous with the containing space 361.

Therefore, the containing space 361 is continuous with an outside through the ventilation part 314.

First Yoke 330 (External Member)

As illustrated in FIG. 12, the first yoke 330 includes an annular part 331 and a cylindrical part 332, and has a step part 333 on an outer side of an outer circumferential surface of the cylindrical part, as in the case of the first yoke 30 according to the first embodiment.

The first yoke 330 has a central hole 334 whose center is located at the rotary axis AX and having a circular shape in plan view into which the guide part 313 can be inserted. The guide part 313 is inserted into an upper portion of the central hole 334 to a substantially intermediate position in the axial direction, and the containing space 361 is formed between the central hole 334 and the shaft 350 below the bottom surface 313a of the guide part 313.

A lower surface 330a of the first yoke 330 is a first opposed part that faces the upper surface 381 of the magnetic disc 380 and expands to a position corresponding to the outer circumferential edge 383 of the magnetic disc 380 in the radial direction, as in the first embodiment.

Second Yoke 340 (External Member)

The second yoke 340 includes a bottom wall part 341 having a substantially circular plate shape in plan view and a side wall part 342 extending upward from a peripheral part of the bottom wall part 341 in the axial direction. The bottom wall part 341 is disposed below the lower surface 382 of the magnetic disc 380, and the side wall part 342 is disposed so as to cover the first yoke 330, the annular member 321, and the exciting coil 320 from outer sides in the radial direction. An upper surface of the bottom wall part 341 faces, as a second opposed part, the lower surface 382 of the magnetic disc 380. Accordingly, one surface (the upper surface 381) of the magnetic disc 380 faces the lower surface 330a of the first yoke 330 serving as a first opposed part, and the other surface (the lower surface 382) of the magnetic disc 380 faces the upper surface of the bottom wall part 341 serving as a second opposed part.

The shaft bearing part 343 that supports the shaft 350 is provided at a center of the second yoke 340 in the radial direction, and the magnetic disc 380 fixed to the shaft 350 is also rotatably supported.

Third Yoke 370 (External Member)

As illustrated in FIG. 12, the third yoke 370 has a substantially circular plate shape and is disposed so as to cover the first yoke 330 and the side wall part 342 of the second yoke 340 from an upper side.

The third yoke 370 has a through-hole 371 having a substantially cylindrical shape passing therethrough in the up-down direction in a region including the rotary axis AX. The through-hole 371 is communicated with the central hole 334 of the first yoke 330 in the up-down direction. The guide part 313 is fixedly inserted into the through-hole 371, and the shaft 350 is further inserted thereinto.

Annular Member 321 (External Member)

As illustrated in FIG. 12, the annular member 321 made of a non-magnetic material and having an annular shape is disposed between the first yoke 330 and the side wall part 342 of the second yoke 340 in the radial direction. The annular member 321 has a circular shape having an external diameter substantially identical to the exciting coil 320 disposed on the step part 333 in plan view. The annular member 321 is fixed between the first yoke 330 and the second yoke 340 in the radial direction, for example, by using a thermosetting material that is a non-magnetic material. Note that the annular member 321 may be made of a material having moderate elasticity and be disposed while being pressed between the first yoke 330 and the second yoke 340.

The magnetic disc 380 is disposed so that the upper surface 381 is separated from the lower surface 330a of the first yoke 330 and the lower surface 321a of the annular member 321 and the outer circumferential edge 383 is separated from the side wall part 342 of the second yoke 340. Furthermore, the magnetic disc 380 is disposed so that the lower surface 382 is separated from the bottom wall part 341 of the second yoke 340.

This forms a continuous gap S between the magnetic disc 380 and the lower surface 330a of the first yoke 330, the lower surface 321a of the annular member 321, and the second yoke 340 that surround the magnetic disc 380. In the gap S, the magnetorheological fluid 390 is disposed as a magnetically responsive material. The gap S may be filled with only the magnetorheological fluid 390 but may contain air as long as resistance to the shaft 350 can be assured.

As described above, the shaft 350 is supported by the inner circumferential surface 313b of the guide part 313 from an outer side in the radial direction and is supported by the shaft bearing part 343 of the second yoke 340 in the axial direction of the rotary axis AX. With this configuration, the shaft 350 and the magnetic disc 380 are stably rotatable about the rotary axis AX relative to the guide part 313, the first yoke 330, the second yoke 340, and the third yoke 370 that constitute the external member.

Magnetic Field Generating Unit

As illustrated in FIG. 12, the exciting coil 320 having an annular shape wound about the rotary axis AX is disposed on the step part 333 of the first yoke 330 between the first yoke 330 and the side wall part 342 of the second yoke 340 in the radial direction. The exciting coil 320 is disposed in a range corresponding to an outer portion of the magnetic disc 380 including the outer circumferential edge 383 of the magnetic disc 380 and the annular member 321 in the radial direction. The exciting coil 320 faces the magnetic disc 380 with the first yoke 330 and the annular member 321 interposed therebetween in the axial direction. Control and operation of the exciting coil 320 are similar to those of the exciting coil 20 according to the first embodiment.

The exciting coil 320 is surrounded by the first yoke 330 and the side wall part 342 of the second yoke 340 from inner and outer sides in the radial direction and is surrounded by the annular part 331 of the first yoke 330 and the bottom wall part 341 of the second yoke 340 on a lower side and by the third yoke 370 on an upper side. Therefore, a magnetic field generated by the exciting coil 320 is guided through a path formed by the first yoke 330, the second yoke 340, and the third yoke 370 to form a magnetic circuit.

When a current is applied to the exciting coil 320, a magnetic field having lines of magnetic force is generated, and lines of magnetic force sequentially passing the first yoke 330, the second yoke 340, and the third yoke 370 are generated so as to surround the exciting coil 320, as in the first embodiment illustrated in FIG. 4. By disposing the annular member 321, the first yoke 330 and the side wall part 342 of the second yoke 340 are magnetically separated below the exciting coil 320, as in the first embodiment.

Lines of magnetic force of a magnetic field generated by the exciting coil 320 pass the magnetorheological fluid 390 in the gap S, and a magnetic flux along the up-down direction crosses the magnetic disc 380. A similar substance to the magnetorheological fluid 90 according to the first embodiment is used for the magnetorheological fluid 390.

When a magnetic field is given to the magnetorheological fluid 390 along the up-down direction, magnetic particles dispersed in the magnetorheological fluid 390 gather along the lines of magnetic force, and the magnetic particles arranged along the up-down direction are magnetically coupled to one another to form a cluster, and when force for rotating the shaft 350 about the rotary axis AX is given, shear force acts on the coupled magnetic particles, and thereby the magnetic particles generate resistance (torque), as in the magnetorheological fluid 90 according to the first embodiment. This allows an operator to feel resistance as compared with a state where no magnetic field is generated. Furthermore, in a case where no magnetic field is generated by the exciting coil 320, the magnetic particles are dispersed in the solvent, and when the operator operates the shaft 350, the holding unit 311 rotates relative to the operating unit 312 without receiving large resistance.

Adjusting Unit

As illustrated in FIG. 15A, the containing space 361 having a hollow annular shape is provided along the outer circumferential surface of the shaft 350 between the first yoke 330 and the shaft 350 in the radial direction and between the guide part 313 and the flange part 352 of the shaft 350 in the axial direction. An inner wall of the containing space 361 includes the step part 357 of the shaft 350, and a position of the step part 357 in the axial direction is determined according to specifications for ventilation from the containing space 361, elasticity and shape of the two V-rings 362a and 362b contained in the containing space 361, and the like.

The two V-rings 362a and 362b serving as adjusting sealing members are disposed in the containing space 361. The V-rings 362a and 362b are ring members made of a material having elasticity and have an identical shape although the V-rings 362a and 362b face different directions. The following describes the V-ring 362b disposed on a lower side as an example. In plan view as illustrated in FIG. 14A, the V-ring 362b has an annular shape whose center is located at the rotary axis AX, and a circumferential direction D1 is defined along an outer shape of the annular shape in plan view. As illustrated in FIG. 14B, a cross section of the V-ring 362b that is orthogonal to the circumferential direction D1 and includes the rotary axis AX forms a V shape. The V shape of the V-ring 362b has two arm parts A11 and A12 extending from a base position P11 (an upper surface position in FIG. 14B) in a direction along the rotary axis AX to a terminal end position P12 (a lower surface position in FIG. 14B). The two arm parts A11 and A12 are configured such that start ends As are joined to each other at the base position P11 and a distance therebetween in the radial direction becomes wider toward the terminal end position P12. The V-ring 362a disposed on an upper side also has these basic features concerning a shape. The two V-rings 362a and 362b are disposed so as to overlap each other in a direction along the rotary axis AX and face opposite directions in the up-down direction so that the base positions P11 thereof are close to each other. That is, the V-ring 362a on an upper side is disposed in a V shape opened on an upper side in a direction along the rotary axis AX, and the V-ring 362b on a lower side is disposed in an inverse V shape opened on a lower side. The two V-rings 362a and 362b are disposed so that the start ends As thereof are in contact with or in proximity with each other in a direction along the rotary axis AX. In a case where the two V-rings 362a and 362b are in contact with each other, a cross section of the two V-rings 362a and 362b that is orthogonal to the circumferential direction D1 and includes the rotary axis AX has an X shape. As a result, the two V-rings 362a and 362b are disposed so that the V shapes thereof are opened as a distance therebetween along the axial direction of the rotary axis AX increases.

The two V-rings 362a and 362b are elastically deformable along the axial direction of the rotary axis AX and the radial direction due to the shape and physical properties of a material of which the two V-rings 362a and 362b are made. For example, in the state illustrated in FIG. 15A, the V-ring 362b on a lower side is in contact with both of the inner circumferential surface 335 of the first yoke 330 and the outer circumferential surface 355 of the shaft 350 in the radial direction due to elastic deformation.

In the following description, a state where the two V-rings 362a and 362b are in contact with surrounding members means a state where the V-rings 362a and 362b are in contact with the surrounding members so as to be slidable up and down while preventing passage of gas and liquid.

As illustrated in FIGS. 15A, 15B, and 15C, the containing space 361 is continuous with the gap S through a connection part 364 serving as a path. In the initial state illustrated in FIGS. 15A and 12, the gap S is filled with the magnetorheological fluid 390, and the connection part 364 and the containing space 361 are full of air. The magnetorheological fluid 390 put into the gap S can flow not only into the gap S, but also into the containing space 361 through the connection part 364.

A space of the containing space 361 below a position where the V-ring 362b on a lower side is provided is an adjustment space 363. When a volume of the magnetorheological fluid 390 changes, a pressure of air in the connection part 364 and the adjustment space 363 increases or decreases. Accordingly, the two V-rings 362a and 362b move up and down together due to the change in pressure of air in the connection part 364 and the adjustment space 363, an upper end position of the adjustment space 363 moves up and down in accordance with this upward or downward movement. When the pressure of the air in the adjustment space 363 increases due to an increase in volume of the magnetorheological fluid 390 from the initial state illustrated in FIG. 15A, the two V-rings 362a and 362b are pushed upward by the increased pressure of the air, as illustrated in FIG. 15B. When the pressure of the air in the adjustment space 363 further increases, the two V-rings 362a and 362b contract in the up-down direction by making contact with the bottom surface 313a of the guide part 313, and the V-ring 362b on a lower side is located above the predetermined position P3 corresponding to the step part 357, as illustrated in FIGS. 15C and 16A. Note that an amount of the magnetorheological fluid 390 can be adjusted in consideration of the volume of the adjustment space 363 and elasticity and shape of the two V-rings 362a and 362b so that an amount of air in the connection part 364 and the adjustment space 363 becomes optimum.

An upper part of the containing space 361 is continuous with the ventilation part 314, and the containing space 361, the two V-rings 362a and 362b, the adjustment space 363, and the ventilation part 314 constitute an adjusting unit along an outer circumference of the shaft 350. Accordingly, the containing space 361 is connected to outside air through the ventilation part 314, and when the two V-rings 362a and 362b are located above the step part 357 (the predetermined position P3) of the shaft 350 in accordance with an increase in volume of the magnetorheological fluid 390, air can flow out from the adjustment space 363 to an outside and flow into the adjustment space 363 from the outside through the ventilation part 314 (FIGS. 15C and 16A).

In a state where at least the V-ring 362*b* on a lower side is elastically in contact with the first yoke 330 and the shaft 350 as illustrated in FIGS. 15A and 15B, air in the adjustment space 363 is prevented from flowing out into the containing space 361 above the adjustment space 363 by the V-ring 362*b* on a lower side.

As illustrated in FIG. 16A, in a state where the two V-rings 362*a* and 362*b* are located above the predetermined position P3 corresponding to the step part 357 due to an increase in volume of the magnetorheological fluid 390, a gap G is generated between the V-ring 362*b* on a lower side and the step part 357 of the shaft 350. An interval between the step part 357 and the V-ring 362*b* on a lower side is determined so that air (the line with alternate long and two short dashes in FIG. 16A) can flow out from the adjustment space 363 to an outside and the magnetorheological fluid 390 does not flow out to an upper side beyond P3 in the gap G by settings such as shapes of the cutout part 356 and the step part 357, elasticity of the two V-rings 362*a* and 362*b*, and viscosity of the magnetorheological fluid 390. This can lower the increased pressure in the adjustment space 363. Furthermore, after the pressure is lowered, the two V-rings 362*a* and 362*b* recover from the contracted state, and the V-ring 362*b* on a lower side is deformed to a lower side beyond the step part 357 as illustrated in FIG. 16B, and therefore outflow of air to an outside stops and a desired pressure can be maintained.

Other configuration, operation, and effects are similar to those in the first embodiment.

Although the shaft 350 has the cutout part 356 in the fourth embodiment, the first yoke 330 may have a cutout part recessed toward an outer side in the radial direction instead. Alternatively, the shaft 350 or the first yoke 330 may have a through-hole leading to an outside and having an outlet at the predetermined position P3 so that air in the adjustment space 363 flows out when the two V-rings 362*a* and 362*b* reach a position beyond the predetermined position P3.

Furthermore, a ventilation part similar to the ventilation part 314 according to the fourth embodiment may be provided between a shaft and an external member in the configurations according to the first embodiment, the second embodiment, the third embodiment, and modifications thereof.

The present invention has been described above while referring to the embodiments, but the present invention is not limited to the above embodiments and can be modified or changed within a purpose of the modifications and the idea of the present invention.

As described above, a torque generation device according to the present invention is useful in that a capacity of a space in which a magnetorheological fluid is sealed can be enlarged and reduced so as to follow expansion and contraction of the magnetorheological fluid without increasing the number of components and without markedly changing a manufacturing process.

What is claimed is:

1. A torque generation device comprising:
   a rotor that is connected to a shaft and is rotatable about a rotary axis of the shaft;
   an external member that is disposed outside the rotor and is rotatable about the rotary axis relative to the rotor;
   a magnetically responsive material disposed in a gap between the rotor and the external member;
   a magnetic field generating unit that generates a magnetic field passing the magnetically responsive material; and
   an adjusting unit provided between the shaft and the external member along an outer circumference of the shaft, wherein
   the adjusting unit has a containing space in which an adjusting sealing member is provided,
   the magnetically responsive material is sealed in the gap, the containing space, and a path connecting the gap and the containing space and is sealed in an adjustment space provided from a position where the adjusting sealing member is provided to the path in the containing space,
   the adjusting unit is configured such that a capacity of the adjustment space is changeable in accordance with a change in volume of the magnetically responsive material,
   the rotor is a rotating plate having a surface perpendicular to the rotary axis,
   the external member has a first shaft bearing part that supports the shaft in a relatively rotatable manner and a first opposed part that faces one surface of the rotating plate, and the first opposed part has a thin plate shape,
   the adjustment space is provided between the first shaft bearing part and the first opposed part in an axial direction of the rotary axis, and
   the external member includes:
   a first sealing member including the first shaft bearing part and the first opposed part; and
   a second sealing member connected to the first sealing member on an outer circumferential side of the rotating plate so that the rotating plate and the gap are sandwiched between the first sealing member and the second sealing member.

2. The torque generation device according to claim 1, wherein
   the adjusting unit is configured such that the adjusting sealing member is movable along an axial direction of the rotary axis in the containing space.

3. The torque generation device according to claim 2, wherein
   the adjustment space is provided between a recessed part of the external member and an outer circumferential surface of the shaft.

4. The torque generation device according to claim 2, wherein
   the adjustment space is provided between a small-diameter part of the shaft and the external member.

5. The torque generation device according to claim 1, wherein
   the adjusting sealing member is a ring member having elasticity.

6. The torque generation device according to claim 1, wherein
   the magnetic field generating unit includes a coil through which a current is passed to generate the magnetic field; and
   the external member includes a first yoke and a second yoke that guide the magnetic field generated by the coil.

7. The torque generation device according to claim 6, wherein
   the adjustment space is provided between the shaft and the first yoke;
   the first yoke includes the first shaft bearing part and the first opposed part; and
   the second yoke has a second opposed part that faces another surface of the rotating plate.

8. The torque generation device according to claim 7, wherein the second yoke includes a second shaft bearing part that supports the shaft in a relatively rotatable manner; and the shaft is supported by the first shaft bearing part from an outer side in the radial direction and is supported by the second shaft bearing part from the axial direction of the rotary axis.

9. The torque generation device according to claim 1, wherein the second sealing member includes a second shaft bearing part that supports the shaft in a relatively rotatable manner; and the shaft is supported by the first shaft bearing part from an outer side in the radial direction and is supported by the second shaft bearing part from the axial direction of the rotary axis.

10. The torque generation device according to claim 9, wherein the magnetic field generating unit includes a coil through which a current is passed to generate a magnetic field;

the external member further includes a first yoke that guides the magnetic field generated by the coil; and the rotating plate and the second sealing member are made of a magnetic body.

11. The torque generation device according to claim 10, wherein the first sealing member is made of a non-magnetic body.

12. The torque generation device according to claim 1, wherein the shaft is made of a non-magnetic body.

13. The torque generation device according to claim 1, wherein the containing space is formed so that an area thereof in a plan view increases toward the rotor.

14. The torque generation device according to claim 1, wherein the adjusting sealing member is a ring member having a shape elastically deformable at least along an axial direction of the rotary axis.

15. A torque generation device comprising:

a rotor that is connected to a shaft and is rotatable about a rotary axis of the shaft;

an external member that is disposed outside the rotor and is rotatable about the rotary axis relative to the rotor;

a magnetically responsive material disposed in a gap between the rotor and the external member;

a magnetic field generating unit that generates a magnetic field passing the magnetically responsive material; and an adjusting unit provided between the shaft and the external member along an outer circumference of the shaft, wherein the adjusting unit has a containing space in which an adjusting sealing member is provided, the magnetically responsive material is sealed in the gap, the containing space, and a path connecting the gap and the containing space and is sealed in an adjustment space provided from a position where the adjusting sealing member is provided to the path in the containing space, the adjusting unit is configured such that a capacity of the adjustment space is changeable in accordance with a change in volume of the magnetically responsive material, the adjusting sealing member is a ring member having a shape elastically deformable at least along an axial direction of the rotary axis, and the ring member is constituted by two V-rings whose cross sections orthogonal to a circumferential direction about the rotary axis each have a V-shape, and each of the two V-rings has, as the V-shape, two arm parts extending from a base end position to a terminal end position in a direction along the rotary axis, and the two arm parts are configured such that start ends thereof are joined to each other at the base end position and a distance therebetween increases in a radial direction toward the terminal end position, and the start ends of the two V-rings are in contact with or in proximity with each other in a direction along the rotary axis.

16. A torque generation device comprising:

a rotor that is connected to a shaft and is rotatable about a rotary axis of the shaft;

an external member that is disposed outside the rotor and is rotatable about the rotary axis relative to the rotor;

a magnetically responsive material disposed in a gap between the rotor and the external member;

a magnetic field generating unit that generates a magnetic field passing the magnetically responsive material; and an adjusting unit provided between the shaft and the external member along an outer circumference of the shaft, wherein the adjusting unit has a containing space in which an adjusting sealing member is provided, the magnetically responsive material is sealed in the gap, the containing space, and a path connecting the gap and the containing space and is sealed in an adjustment space provided from a position where the adjusting sealing member is provided to the path in the containing space, the adjusting unit is configured such that a capacity of the adjustment space is changeable in accordance with a change in volume of the magnetically responsive material, the adjusting unit is configured such that the adjusting sealing member is movable along an axial direction of the rotary axis in the containing space, and the adjusting unit includes a ventilation part that allows outside air to flow out of the containing space and into the containing space.

* * * * *